United States Patent
Martin et al.

(10) Patent No.: US 10,704,197 B2
(45) Date of Patent: *Jul. 7, 2020

(54) NANOCELLULOSE

(71) Applicant: THE UNIVERSITY OF QUEENSLAND, St Lucia, Queensland (AU)

(72) Inventors: Darren James Martin, St Lucia (AU); Pratheep Kumar Annamalai, St Lucia (AU); Nasim Amiralian, St Lucia (AU)

(73) Assignee: The University of Queensland, St Lucia, Queensland (AU)

( * ) Notice: Subject to any disclaimer, the term of this patent is extended or adjusted under 35 U.S.C. 154(b) by 227 days.

This patent is subject to a terminal disclaimer.

(21) Appl. No.: 15/038,357

(22) PCT Filed: Nov. 21, 2014

(86) PCT No.: PCT/AU2014/050368
§ 371 (c)(1),
(2) Date: May 20, 2016

(87) PCT Pub. No.: WO2015/074120
PCT Pub. Date: May 28, 2015

(65) Prior Publication Data
US 2016/0289893 A1    Oct. 6, 2016

(30) Foreign Application Priority Data

Nov. 22, 2013 (AU) .............................. 2013904527

(51) Int. Cl.
| | |
|---|---|
| C08B 11/00 | (2006.01) |
| C08B 3/22 | (2006.01) |
| D21C 5/02 | (2006.01) |
| D21C 5/00 | (2006.01) |
| B82Y 40/00 | (2011.01) |
| D21H 11/12 | (2006.01) |
| D21H 11/18 | (2006.01) |
| D21C 9/00 | (2006.01) |
| D21C 3/04 | (2006.01) |
| D21C 3/02 | (2006.01) |
| D21C 3/06 | (2006.01) |
| D21C 9/10 | (2006.01) |

(52) U.S. Cl.
CPC ............... D21C 5/00 (2013.01); B82Y 40/00 (2013.01); D21C 3/02 (2013.01); D21C 3/04 (2013.01); D21C 3/06 (2013.01); D21C 9/007 (2013.01); D21C 9/10 (2013.01); D21H 11/12 (2013.01); D21H 11/18 (2013.01)

(58) Field of Classification Search
CPC .............. C08B 11/20; C08B 3/22; D21C 5/02
USPC ....................................................... 536/86, 77
See application file for complete search history.

(56) References Cited

U.S. PATENT DOCUMENTS 8,557,307 B2 * 10/2013 Archer .................... C10B 53/02
424/725
2013/0303750 A1   11/2013 Zhu et al.

FOREIGN PATENT DOCUMENTS

| WO | 2008/027096 A1 | 3/2008 |
| WO | WO 2012/097446 | 7/2012 |
| WO | 2014/085730 A1 | 6/2014 |

OTHER PUBLICATIONS

Extended European Search Report and Supplementary European Search Report dated Apr. 24, 2017, issued in European Patent Application No. 14863891.9.
International Search Report for PCT/AU2014/050368, dated Feb. 2, 2015, 6 pages.
Written Opinion of the ISA for PCT/AU2014/050368, dated Feb. 2, 2015, 8 pages.
Sain et al., "Biodegradable nanocomposites from wheat straw", AIChE Annual Meeting, Conference Proceedings, San Francisco, CA, United States, 2006, p. 632b/1-b/8, see Abstract; p. 632b/3, Table 1; p. 632b/2 "Isolation of the Nanofibers"; and pp. 632b/7-b/8 "Conclusions".
Chen et al., "Preparation of millimeter-long cellulose I nanofibers with diameters of 30-80 nm from bamboo fibers", Carbohydrate Polymers, 2011, 86(2), p. 453-461, see Abstract; p. 454, sections 2.1-2.2; p. 459, col. 1; and Figure 4.
Wu, et al., "Influence of temperature and humidity on nanomechanical properties of cellulose nanocrystal films made from switchgrass and cotton", Industrial Crops and Products, Jul. 2013, 48, p. 28-35, see Abstract; p. 29, sections 2.2-2.3.
Lee et al., "Conversion of Lignocellulosic Biomass to Nanocellulose: Structure and Chemical Process", The Scientific World Journal, 2014, vol. 2014, Article ID 631013, p. 1-20 [online], [retrieved from internet on Jan. 7, 2015] <URL: http://www.hindawi.com/journals/tswj/2014/631013/> see p. 2, Table 1.

\* cited by examiner

*Primary Examiner* — Shaojia A Jiang
*Assistant Examiner* — Everett White
(74) *Attorney, Agent, or Firm* — Nixon & Vanderhye P.C.

(57) ABSTRACT

A nanocellulose material of plant origin comprising nanocellulose particles or fibres derived from a plant material having a hemicellulose content of 30% or higher (w/w) (calculated as a weight percentage of the lignocellulosic components of the material). The nanocellulose may have an aspect ratio of greater than 250. The nanocellulose may be derived from plant materials having C4 leaf morphology. The plant material may be obtained from arid *Spinifex*. The nanocellulose can be made using mild processing conditions.

21 Claims, 12 Drawing Sheets

NANOCELLULOSE

This application is the U.S. national phase of International Application No. PCT/AU2014/050368 filed 21 Nov. 2014, which designated the U.S. and claims priority to AU Patent Application No. 2013904527 filed 22 Nov. 2013, the entire contents of each of which are hereby incorporated by reference.

TECHNICAL FIELD

The present invention relates to nanocellulose material, especially nanocellulose material of plant origin. The nanocellulose material is derived from plant sources and may have high hemicellulose content and/or may have a high aspect ratio. The present invention also relates to methods for producing the nanocellulose material.

BACKGROUND ART

In the last few decades, the use of natural fibres to reinforce polymer composites has been increasing because of their sustainability, renewability, biodegradability, low thermal expansion, manufacturer-friendly attributes such as low density and abrasiveness, excellent mechanical properties such as very high specific stiffness and strength and consumer-friendly attributes such as lower price and higher performance. A typical natural microfibre consists of bundles of nanofibres which in turn consist of several or more elementary (primary) nanofibrils formed by cellulose chains (a homopolymer of glucose), concreted by/in a matrix containing lignin, hemicellulose, pectin and other components. The diameter of primary cellulose nanofibrils is typically in the range 3-4 nm. The nanofibrils consist of monocrystalline cellulose domains linked by amorphous domains. Amorphous regions act as structural defects and can be removed under acid hydrolysis, leaving cellulose rod-like nanocrystals, which are also called whiskers, and have a morphology and crystallinity similar to the original cellulose fibres. Depending on the source of cellulose, the cellulose content varies from 35 to 100%. These fibres, isolated in their primary nanofibrillar form exhibit extraordinarily higher mechanical properties (stiffness/strength) than at the microscale (as bundles of nanofibres) or in their natural state. In recent years, these nanocrystalline cellulose fibres have been explored as biologically renewable nanomaterials that can be applied in several engineering applications. While numerous methods have been explored for the production of microfibrillated cellulose (MFC), which by definition (Reference: Robert J. Moon, Ashlie Martini, John Nairn, John Simonsen and Jeff Youngblood, 'Cellulose nanomaterials review: structure, properties and nanocomposites' Chem. Soc. Rev., 2011, 40, 3941-3994), consists of cellulose fibres with diameters in the range of 20-100 nm and a length in the range between 0.5 µm and tens of microns, the production of nanofibrillated cellulose (NFC), and cellulose nanocrystals (CNCs) is more challenging due to the requirement to separate or deconstruct the cellulose fibres and/or crystals to a much greater degree. Attempts to date to produce these two types of nanocellulose (CNCs and NFCs) have focussed on the use of chemical, physical, mechanical and enzymatic steps as pre-treatments between conventional pulping processes and final mechanical defibrillation processing alone or in combinations thereof. For NFC, the prior art refers to a fibre diameter in the range of 3-20 nm and a length in the range between 0.5 and 2 µm. These nanofibrils can be further made up of primary cellulose nanofibrils typically having a diameter of 3-4 nm. For example, a cellulose nanofibril with a diameter of 10 nm may consist of a bundle of a few primary cellulose nanofibrils with 3-4 nm diameter. For CNC, the prior art refers to fibre/crystal diameters/widths in the range of 3-20 nm and lengths of up to 500 nm (except the special example of tunicate CNCs or t-CNCs, which have a higher aspect ratio).

A typical procedure for isolating nanocrystals of cellulose relies on acid hydrolysis using corrosive acids (like $H_2SO_4$ and HCl), followed by centrifuging, dialysing, ultrasonication and drying (a typical flowchart showing this process is shown in FIG. 1). Depending on the cellulose source and hydrolytic conditions, cellulose nanocrystals (CNCs) with the diameter range of 3-15 nm and length in the range of 50-500 nm are isolated. Some of these products are produced at semi-commercial scale (e.g. 1 tonne per day) using wood fibres as the raw material. High aspect ratio cellulose nanocrystals (with an aspect ratio of 65-100) can be obtained from rare marine animals called tunicates (urochordates), but this is not a commercially viable or sustainable route. Therefore, the sustainable production of nanocrystals that are of a higher aspect ratio, or closer to that of CNCs derived from tunicates (t-CNCs), and doing so from plant source materials, remains a challenge.

For isolation of microfibres, which are called microfibrillated cellulose (MFC) with diameters in the range of 20-100 nm and length in the range of 0.5-10's µm, mechanical methods such as ultrasonication, homogenisation, milling, grinding, cryocrushing, or combinations of these are widely used to defibrillate the macroscale bleached pulp fibres into MFC fibrils which essentially consist of bundles of nanofibrils. In order to further refine and separate the MFC into its constituent nanofibrils and to isolate these further thinner particles called nanofibrillated cellulose (NFC) or cellulose nanofibrils (CNF), with diameters in the range of 3-20 nm and lengths in the range of 500-2000 nm, a significantly larger amount of mechanical energy typically needs to be applied than that required to refine material to the microfibrillar level. In reported methods, additional chemical or enzymatic pre-treatments applied after pulping and bleaching but prior to mechanical processing are usually claimed to be beneficial for reducing both mechanical energy consumption and resultant nanofibre diameter, as the chemical agents can aid in the removal of matrix materials such as lignin and hemicellulose that bind the fibres together. FIGS. 2A and 2B compare two typical procedures used in the art for producing MFC and NFC, respectively.

Delignification and bleaching are chemical processes widely used in the paper manufacturing industry and are key steps in the pulping process.

When a large amount of mechanical energy is applied to a cellulosic feedstock or the cellulose is exposed to harsh chemical pre-treatments, the cellulose fibres can be prone to breakage, thereby reducing their length and aspect ratio. Therefore, the production of nanocellulose is typically governed by a delicate balance between the requirement to input sufficiently large amounts of energy in order to isolate the nanofibres and the propensity of this large amount of energy to break fibres, thereby reducing their length and aspect ratios. Consequently, efforts to manufacture nanocellulose at commercial scale have been hindered by the high cost introduced by these additional processing steps and the challenge of avoiding fibre breakdown during processing. In manufacturing nanocellulose, mechanical processing is typically performed by passing a cellulosic feedstock through a mechanical processing step a number of times to facilitate the gradual breakdown of the cellulose to its nanoscale fibrils. For example, cellulosic feedstock material may be passed through equipment such as a homogeniser or disc refiner several times or more before the cellulose is sufficiently separated that predominantly nanofibres are yielded. In a commercial process, this requirement to pass the material through the same step multiple times can result in high energy costs and long processing times, reducing the commercial attractiveness of the process. Some examples of typical processing conditions disclosed in the patent literature for producing cellulose nanofibrils, including the number of passes through a particular mechanical processing step are set out in Table 1 below:

TABLE 1

Different mechanical methods for the production of cellulose nanofibrils

| Reference/Patent | Methods | Comments |
| --- | --- | --- |
| U.S. Pat. No. 4,374,702 | Temperature assisted homogenisation (8-20 passes) | Obtained type: MFC (no fibre diameter is reported) |
| U.S. Pat. No. 6,183,596 & U.S. Pat. No. 6,214,163 | Rubbing (shear) Supergrinding High pressure homogenisation | MFC (no fibre diameter is reported) |
| U.S. Pat. No. 7,381,294 & WO 2004/009902 | Double disc refiner (shearing) (up to 80 passes) | MFC was produced with diameter >0.1 µm after 15 passes |
| U.S. Pat. No. 5,964,983 | Alkaline pre-treatment and acid hydrolysis coupled with screening or homogenisation | NFCs are produced, after grinding or homogenising (8-10 passes) after acid hydrolysis at 60-100° C. |
| WO 2007091942 | Enzymatic pre-treatment and high pressure homogenisation | NFCs are produced after 5 passes |
| US 2008/0057307 & U.S. Pat. No. 7,566,014 | Low shear refining followed by high shear refining or homogenisation | NFCs are produced after 7 passes |
| WO2012/097446 & US 2011/0277947 | Double disc refiner | NFCs are produced after 8 passes |

Some processes for the manufacture of cellulose nanofibrils use a chemical pre-treatment called TEMPO oxidation in which a cellulose pulp is exposed to TEMPO [(2,2,6,6-Tetramethylpiperidin-1-oxyl (CAS No: 2564-83-2). This pre-treatment loosens the nanofibrils, making it easier to defibrillate them from each other in subsequent mechanical processing. TEMPO processing enables 3-4 nm diameter nanofibrils to be obtained, however TEMPO agents are expensive and toxic, making their use and disposal difficult. In addition, the use of TEMPO agents results in conversion of the surface of the nanofibrils from one dominated by hydroxyl groups to one dominated by carboxyl groups. This can be a disadvantage when modification of the cellulose surface chemistry for some applications requires a hydroxylated surface.

Literature published before 2011 tends to use the terms MFC and NFC interchangeably, with these terms being used for both nanofibrils and microfibrils. In this specification, we distinguish between MFCs and NFCs, using the definitions given by Moon et. al. Chem Soc. Review' 2011. Throughout this specification, the terms "MFC" (microfibrillated cellulose) and "CMF" (cellulose microfibre) are used to describe fibrils, including bundles of nanofibrils, with a diameter above 20 nm and length in 10 s of microns. The terms "NFC" (nanofibrillated cellulose) and "CNF" (cellulose nanofibre) are used to describe nanofibrils having a diameter between 3 to 20 nm. The NFCs obtained by the present invention are significantly longer than NFCs described in the prior art and may have a length above 500 nm up to 7 microns or longer. The term "CNC" is used to describe cellulose nanocrystals, which are rod-like or whisker shaped particles that are typically produced after acid hydrolysis of bleached pulp, MFC or NFC. CNCs with a high aspect ratio (3-5 nm diameter, 50-500 nm in length), are essentially 100% cellulose and are highly crystalline (54-88%). The CNCs obtained via acid hydrolysis in the present invention are longer (up to 1.5-2 microns or longer) than CNCs obtained in the prior art.

Commercial nanocellulose production largely uses wood as a source of cellulose due to wood's abundance, availability in commercial quantities and given that much of the development of nanocellulose has been supported by the forestry industry, motivated by a desire to find new applications for wood.

In one aspect, the present invention relates to producing NFC with lowest possible energy (that is generally used for MFC production). As stated in paragraph [0002] of this specification, production of NFC and CNC (cellulose nanocrystals) is more difficult than production of MFC due to the requirement to separate or deconstruct the cellulose fibres to a much greater degree. This typically results in the cellulose fibres being broken, resulting in the length of the fibres becoming significantly shorter and thus reducing the aspect ratio of the fibres.

In general, the prior art discloses that manufacturing processes requiring high energy input, disadvantaged by clogging problems during mechanical processing, complex recovery methods, harsh chemical treatments and/or high energy mechanical treatments are required to produce nanocellulose materials.

It will be clearly understood that, if a prior art publication is referred to herein, this reference does not constitute an admission that the publication forms part of the common general knowledge in the art in Australia or in any other country.

SUMMARY OF INVENTION

The present invention is directed to nanocellulose material of plant origin that may have a high hemicellulose content and/or may have a high aspect ratio.

With the foregoing in view, the present invention in one form, resides broadly in a nanocellulose material of plant origin comprising nanocellulose particles or fibres derived from a plant material having a hemicellulose content of 30% or higher (w/w).

Plant materials are composed of many different substances including waxes and resins, ash and lignocellulosic components. Lignocellulosic components are the major components of plant matter and comprise lignin, cellulose and hemicellulose. Throughout this specification, the hemicellulose content of materials is discussed in percentage terms. In all cases, the hemicellulose content is quoted as a mass percentage of the total mass of the lignocellulosic components only of the relevant material.

In a second aspect, the present invention provides a nanocellulose material of plant origin comprising nanocellulose particles or fibres having an aspect ratio of at least 250.

In another embodiment, the present invention provides a nanocellulose material of plant origin comprising nanocellulose particles or fibres derived from a plant material having a hemicellulose content of 30% or higher (w/w) and having an aspect ratio of at least 250.

The present inventors have surprisingly found that plant material derived from a plant material having a hemicellulose content of 30% or higher (w/w) could be separated into nanofibrils or nanocrystals using significantly less harsh or less energy intensive treatments than known in the prior art. In one embodiment, the plant material is derived from a plant material having C4 leaf anatomy.

In another embodiment, the present invention provides a nanocellulose material derived from plants having C4 leaf anatomy comprising nanocellulose particles or fibres having an aspect ratio of at least 250. Throughout this specification, the term "aspect ratio" is used to refer to the ratio determined from the maximum dimension of the nanocellulose particle divided by the minimum dimension of the nanocellulose particle. For nanocellulose fibres, the aspect ratio is determined by dividing the average length of the fibre by the average diameter of the fibre. The average diameter of water-washed, delignified, bleached, chemical and mechanical treated fibres was determined using digital image analysis (Image J). For each sample, 250 measurements of diameter were randomly selected and measured from several TEM images with the same magnification. For measuring the length of *spinifex* water-washed delignified, and bleached fibres, and also short cellulose nanocrystals, digital image analysis (Image J) was used. For measurement of the length of long and curly *spinifex* NFC two different methods were employed; (a) cryo-TEM, a 3D tomography, and (b) measurement from TEM images by AutoCAD software. Cryo-TEM was carried out using a plunge freezing protocol. Here, 4 µL of NFC dispersion in water was transferred onto TEM holey carbon grids (C-flat and lacey carbon), in an FEI Vitrobot Mark 3 (FEI Company, Eindhoven, the Netherlands), while the chamber was set to 100% humidity at room temperature (~22° C.). Optimal blot time was 3-5 seconds, and then the sample was plunged into liquid ethane. The frozen/vitrified samples were viewed on a Tecnai F30 TEM (FEI Company) operating at 300 kV, and imaged at 23,000× magnification with a Direct Electron LC1100 4 k×4 k camera (Direct Electron, San Diego, United States), using low-dose mode of SerialEM image acquisition software. The reason that samples were subjected to low-dose conditions is the extreme sensitivity of the unstained cellulose nanofibres to beam damage. This consisted of using spot size five, making focus and exposure adjustments outside of the image capture area, creating a map of grid locations at very low magnification where area selection was based on the quality of vitreous ice rather than sample morphology, and performing subsequent high magnification imaging via an automated batch imaging function in SerialEM, where the total electron dose was limited to 130 electrons/Å$^2$ or less. The tilt range was +/−60° with an increment of ~1.5° to 2.5°.

For Image processing and analysis 125 2D images were captured in this instance and the raw image data was then processed using IMOD processing and modeling software. This program allows contours to be manually drawn following the non-linear path of each cellulose nanofibril in xy space and contains tools for the subsequent calculation of contour length.

In one embodiment, the nanocellulose particles or fibres have an aspect ratio of between 250 to 10,000, or between 250 to 5000, or between 250 to 1000, or between 260 to 1000, or between 266 to 1000, or between 266 to 958.

The nanocellulose material preferably comprises cellulose nanocrystals (CNC) or nanofibrillated cellulose (NFC).

In some embodiments, the range of the aspect ratio of the nanocellulose particles or fibres has a lower limit of 250, or 266, or 280, or 300, or 400, or 500. In some embodiments, the upper range of the aspect ratio of the nanocellulose particles or fibres is 10,000, or 5000, or 4000, or 3000, or 2000, or 1000, or 958, or 800, or 700, or 600, or 550.

The nanocellulose particles or fibres may have a diameter of up to 20 nm, or up to 15 nm, or up to 10 nm, or up to 8 nm, or up to 6 nm, or up to 5 nm. In one embodiment, 250 individual measurements of fibre diameter were made and the following results were obtained: 1-2 nm: 11 measurements, 2-3 nm: 90 measurements, 3-4 nm: 127 measurements, 4-5 nm: 19 measurements, 5-6 nm: 5 measurements This is shown in FIGS. 6A & 9.

It will be appreciated that the fibre diameter and aspect ratio values of any given sample of nanocellulose of the present invention will be composed by a distribution of values where the value quoted approximately represents an average of values for different fibres in a sample.

The nanocellulose particles or fibres may have a length that falls within the range of from 200 nm up to 10 µm.

The nanocellulose material of the present invention is of plant origin and therefore is derived from plant sources. In one embodiment, the nanocellulose of the present invention is derived from plant material in which the amount of hemicellulose in the plant material is greater than the amount of lignin in the plant material.

In one embodiment, the plant feedstock used in the production of nanocellulose of the present invention has a hemicellulose content of at least 30%. In some embodiments, the plant material has a hemicellulose content of from 30 to 55% w/w, or from 30 to 50% w/w, or from 36 to 48% w/w, or from 40 to 48% w/w or from 42 to 47% w/w, or any intermediate range within the ranges set out above.

In one embodiment, the plant material is derived from a grass species having C4-leaf anatomy. The present inventors believe that any plant materials from grasses having C4-leaf anatomy can be used to produce the nanocellulose material (NFC or CNC) in accordance with the present invention. Such plants can also be treated with the low energy method or gentle chemical method described in this specification to produce the nanocellulose material.

In one embodiment, the plant material is derived from a drought-tolerant grass species.

In one embodiment, the plant material is derived from arid grass species.

In one embodiment of the present invention, the plant material is derived from Australian native arid grass known as "*spinifex*". Spinifex (also known as 'porcupine' and 'hummock' grass) is the long-established common name for three genera which include *Triodia, Monodia,* and *Symplectrodia* (not to be confused with the grass genus *Spinifex* that is restricted to coastal dune systems in Australia). Hummock grassland communities in arid Australia are dominated by *spinifex* species of the genus '*Triodia*'. There are 69 described species of *Triodia*, which are long-lived and deep rooted allowing root growth to penetrate through tens of metres under the ground. Of the 69 species, abundant species are two soft species called *T. pungens, T. shinzii* and two hard species *T. basedowii, T. longiceps. T. pungens* has a typical composition of: cellulose (37%), hemicellulose (36%), lignin (25%) and ash (4%) in the un-washed form, such that hemicellulose content makes up 37% of the lignocellulosic content.

In another aspect, the present invention provides a nanocellulose material produced from plant material derived from arid *spinifex*.

Without wishing to be bound by theory, the present inventors believe that, in most plant sources of nanocellulose, the cellulose molecules are biosynthesized to form long elementary fibrils. When these long fibrils are tightly packed with either covalently or secondary bonding, the required amount of energy to separate the fibres may be higher than if the fibrils had been packed less loosely. With high energy (both mechanical and chemical) pre-treatments, the aspect ratios of these long fibrils might be decreased during the harsh processing required to isolate these tightly packed fibrils. In the case of *Triodia* grass, the elementary fibrils might be loosely packed thus facilitating easier defibrillation. This can be explained with our results and prior art.

Again without wishing to be bound by theory, the present inventors believe that the defibrillation of this grass is easier due to a combination of the following (1) structural morphology (loosely packed bundles of fibrils in the primary cell walls), (2) higher hemicellulose content (which is common in plants with C4 leaf anatomy), which ensures lower content of cementous lignin and pectin and (3) low energy pre-treatments.

In general, the cellulose fibrils that are bundled in the primary cell wall, are surrounded by hemicelluloses and pectins. The peculiar behaviour of *spinifex* can be traced back to the particular morphology of *spinifex* which mainly consists of parenchyma tissue in the primary wall. These walls are rather fragile, as the cellulose fibrils are organized in a relatively looser network embedded in an abundant matrix consisting of hemicelluloses and pectin, while the common secondary cell walls are much stronger, due to the presence of tightly packed cellulose microfibrils with lignin. This relatively looser arrangement and high content of hemicellulose may be a strategy of the plant to help it retain water during periods of drought (hemicellulose is mainly responsible for moisture absorption and retention in the plant fibre). Because of slack fibrillar interaction with the matrix in the primary cell wall, fibrils can easily be separated from one another by mechanical treatment. Cross-section SEM images of *T. Pungens* (see FIG. 3) show that the bundles of cellulose microfibrils are separated by nodular structure on the surface, ensuring the slack assembly of fibres. The high hemicellulose content may also assist in separation of fibres since hemicellulose imparts a negative charge on the surface of the fibres, such that opposing negatively charged fibres repel each other.

Even after mild delignification, the structure of stroma lamellae is preserved and this provides a good dispersability of fibres in water.

Similar to other grasses, *spinifex* has several cell types in the leaf epidermis including epidermal cells and stomata, resin producing cells (soft species only), fibre, mesophyll, vascular tissue, multi-cellular hairs and unicellular papillae. Spinifex grasses exhibit a 'modified $C_4$ leaf anatomy' which possesses two types of cells viz. outer mesophyll cells and inner spongy bundle sheath cells arranged in a circular manner like a necklace. In *Triodia*, the bundle of sheath cells seems to be extended beyond the vascular bundle and surrounded by mesophyll tissue (photosynthetic parenchyma cells that lie between the upper and lower epidermis layers of a leaf). *Triodia pungens* possesses a higher percentage of mesophyll tissues that are predominantly found in the primary wall. So we believe that this structure of *spinifex* enables the cellulose fibrils to be "deconstructed" more easily without applying harsh treatments which cause to damage the fibrils and results in fibres with a shorter average length.

Example plants with C4 leaf anatomy that may be used in the present invention include *Digitaria sanguinails* (L.) Scopoli, *Panicum coloratum* L. var. *makarikariense* Goossens, *Brachiaria brizantha* (Hochst. Ex A. Rich) Stapf, *D. violascens* Link, *P. dichotomiflorum* Michaux, *B. decumbens* Stapf, *Echinochloa crus-galli* P. Beauv., *P. miliaceum* L., *B. humidicola* (Rendle) Schweick, *Paspalum distichum* L., *B. mutica* (Forsk.) Stapf, *Setaria glauca* (L.) P. Beauv, *Cynodon dactylon* (L.) Persoon, *Panicum maximum* Jacq., *S. viridis* (L.) P. Beauv, *Eleusine coracana* (L.) Gaertner, *Urochloa texana* (Buckley) Webster, *Sorghum sudanense* Stapf, *E. indica* (L.) Gaertner, *Spodiopogon cotulifer* (Thunb.) Hackel, *Eragrostis cilianensis* (Allioni) Vignolo-Lutati, *Chloris gayana* Kunth, *Eragrostis curvula, Leptochloa dubia, Muhlenbergia wrightii, E. ferruginea* (Thunb.) P. Beauv., *Sporobolus indicus* R. Br. var. *purpureosuffusus* (Ohwi) *T. Koyama, Andropogon gerardii, Leptochloa chinensis* (L.) Nees, grasses of the *Miscanthus* genus (elephant grass), plants of the genus *Salsola* including Russian Thistle, ricestraw, wheat straw, and corn stover, and *Zoysia tenuifolia* Willd.

Since the *Triodia* grasses are grown under arid conditions, the present inventors believe that other arid grasses that grow in Australia and other parts of the world may also be used in the present invention. The most drought tolerant grass genera, in Australia, (though they need water in their first 1 or 2 years) include *Anigozanthos, Austrodanthonia, Austrostipa, Baloskion pallens, Baumea juncea, Bolboschoenus, Capillipedium, Carex bichenoviana, Carec gaudichaudiana, Carex appressa, C. tereticaulis, Caustis, Centrolepis, Clitoris truncate, Chorizandra, Conostylis, Cymbopogon, Cyperus, Desmocladus flexuosa, Dichanthium sericeurn, Dichelachne, Eragrostis, Eurychorda complanata, Evandra aristata, Ficinia nodosa, Gahnia, Gymnoschoenus sphaerocephalus, Hemarthria uncinata, Hypolaeana, Imperata Johnsonia, Joycea pallid, Juncus, Kingia australis, Lepidosperma, Lepironia articulate, Leptocarpus, Lamandra, Meeboldina, Mesomelaena, Neurachne alopecuroidea, Notodanthonia, Patersonia, Poa, Spinifex, Themedo triandra, Tremulina tremula, Triglochin, Triodia* and *Zanthorrhoea.*

Arid grasses that grow in other parts of the world that may also be used in the present invention include *Aristida pallens* (Wire grass), *Andropogon gerardii* (Big bluestem), *Bouteloua eriopoda* (Black gram), *Chloris roxburghiana* (Horsetail grass), *Themeda triandra* (Red grass), *Panicum virgatum* (Switch grass), *Pennisetum ciliaris* (Buffel grass), *Schizachyrium scoparium* (Little bluestem), *Sorghatrum nutans* (Indian grass), *Ammophila arenaria* (European beach grass) and *Stipa tenacissima* (Needle grass).

The present inventors have also discovered that nanocellulose particles or fibres can be produced from species of *spinifex* using methods that generally involve less harsh chemical treatments and/or less energy intensive mechanical treatments than have been used in the processes disclosed in the prior art. This has apparent beneficial implications in respect of the consumption of chemicals and energy consumption in the manufacture of the nanocellulose particles or fibres.

In another aspect, the present invention provides a method of producing nanocellulose particles or fibres from plant material derived from plants having a hemicellulose content of 30% (w/w) or higher comprising the steps of delignification and optionally bleaching the plant material, followed by separating the plant material into nanofibrils or nanocrystals, wherein the step of separating the plant material into nanofibrils or nanocrystals is selected from a) a low energy mechanical separation; and/or
b) a mild chemical treatment step.

Importantly, the method of the present invention does not require the use of a pre-treatment step after the pulping steps of delignification and optionally bleaching and before the step(s) carried out to separate the pulp into constituent nanofibrils.

The pulping steps of delignification and bleaching are well known to those skilled in the art of paper manufacture.

With regard to plant material derived from and *spinifex*, it seems that the hemicellulose (especially xylan) remained associated with the microfibril s after delignification chemical treatments (based on NMR results), and this is likely to be responsible for the easy cell wall disruption during a subsequent mechanical treatment, and also for the specific properties of the *spinifex* cellulose microfibrils when they are homogenized or milled and suspended in water.

In one embodiment, the plant material having a lesser amount of lignin than hemicellulose comprises a plant material derived from arid grasses in another embodiment, the plant material having a lesser amount of lignin than hemicellulose is derived from Australian arid grass *spinifex* of the genus *Triodia*. In a further embodiment, the plant material comprised plant material from *Triodia pungens*.

In one embodiment, the plant material having a hemicellulose content of 30% (w/w) or greater comprises a plant material derived from arid grasses. In another embodiment, the plant material having a hemicellulose content of 30% (w/w) or greater is derived from Australian arid grass *spinifex* of the genus *Triodia*. In a further embodiment, the plant material comprised plant material from *Triodia pungens*.

In one embodiment, the low energy mechanical separation comprises homogenisation of the plant material by subjecting the plant material to 5 passes or less, or 3 passes or less, preferably 2 passes or less, through a homogenisation step. The homogenisation step may comprise passing the material through a high pressure homogenizer.

Treating fibres with a homogeniser typically comprises submitting a dilute fibre suspension in water to a homogeniser in order to delaminate fibres. Applying a large pressure drop under high shear forces and impact forces, for example, against a valve and a ring leads to splitting or fibrillating the fibres into nanofibrils. In order to increase the degree of fibrillation, prior art processes cycled the fibres through a high pressure homogenizer using approximately 10-30 passes. It is obvious that with increasing the number of passes, the required energy for fibrillation is markedly increased. The other disadvantage of using a homogenizer to cause fibrillation is that "system clogging" by the long fibres is a common problem which requires disassembly of equipment and operator time to unclog. In contrast, in the present invention, passing the fibres through the homogeniser 5 times or fewer has been found to be sufficient to produce nanocellulose particles or fibres such that the occurrence of clogging is lessened. Others have reported as few as 5 passes. The present inventors have successfully produced NFC of the present invention using as few as 1 single pass through a homogeniser. The present inventors have used a pressure as low as 150 bar, where others have generally required 500 to 2500 bar. Surprisingly, the present inventors were able to produce nanofibrils of the present invention from *spinifex* using both the lowest pressure and fewest number of passes in combination, when compared to prior art processes.

For experiments conducted by the present inventors, the range of applied pressure of homogenizer is 150-1500 bar and the number of passes is in the range of 1-15.

The minimum applied pressure in our work was 150 bar. In some experiments conducted by the present inventors, using a pressure of 150 bar and 1-3 passes through the homogenizer resulted in production of NFC with 3-5 nm average fibre diameters. In a further embodiment, the range of applied pressure is 200-700 bar or preferably 250-650 or preferably 300-600 bar or more preferably 350-550 bar.

In another embodiment, the low energy mechanical separation step comprises bead milling, ball milling, disk-rotator or stator refining, cryo-crushing, steam explosion, grinding, refining, high intensity ultrasonic, microfluidisation, high shear processing such as that performed with Silverson type mixers, processing with other rotor-stators or micronizing or a combination of these. Other separation methods known to those skilled in the art may also be used.

Any combination of mechanical processing treatments described above may be used to process the cellulosic pulp to nanocellulose. For example, if high pressure homogenisation is used to process the cellulose to the final nanofibril product, the pulp material may first be passed through a Silverson type mixer to partially fibrillate the cellulose bundles, allowing even lower energy processing in a high pressure homogeniser had the Silverson processing not been performed. In doing so, the cellulose bundles are partially fibrillated in the first processing step and then fibrillation is complete in the second processing step. In cases where there is a cost difference between two mechanical processing methods that can be used in fibrillation, the use of a low cost processing step (such as Silverson or rotor-stator fibrillation) can reduce the amount of energy or processing time required in a subsequent and more expensive step such as high pressure homogenisation, lowering the processing cost overall. The first mechanical step can also act to pre-homogenise the pulp before processing at the second mechanical step, reducing the chances of clogging problems during second stage processing which lead to equipment downtime.

In a further embodiment, the mild chemical treatment comprises an acid hydrolysis step conducted using an acid solution having an acid concentration below 45%, the acid hydrolysis step being conducted at a temperature below 50° C. In one embodiment, the acid hydrolysis step may be conducted at an acid concentration of about 35% to 40% and a temperature of about 45° C. The acid may comprise sulphuric acid, hydrochloric acid or any other suitable acid. Typically, with other nanocellulose production methods, harsh chemical treatment conditions are required in order to sufficiently separate the cellulose fibres into fibres with nanometre scale diameters. However, such harsh conditions also tend to cause breakage of the fibres such that there lengths are reduced. In doing so, the production of high aspect ratio cellulose nanocrystals and/or nanofibrillated cellulose has been challenging. The above combination of especially mild acid concentration and treatment temperatures has not previously been reported as being suitable for obtaining nanofibres or nanocrystals of cellulose with the aspect ratios of the present invention.

The present inventors also added a harsh ultrasonication treatment after acid hydrolysing (70% amplitude for 20 minutes), and yet the *spinifex* nanofibres did not break to shorter fibres and still retained a high aspect ratio. The average diameter of acid treated fibres was 4±1.4 nm.

In other embodiments, the plant material may be separated into nanofibrils or nanoparticles using carboxymethylation, or 2,2,6,6-tetramethylpiperidinyl-1-oxyl (TEMPO)- mediated oxidation or enzyme-treatment. In another embodiment, a steam explosion process may be used for converting lignocellulosic biomass with the final aim of separating nanofibrils.

It is preferred that the plant material is subject to pulping in which the plant material is pulped by delignification and optionally bleaching prior to separating the plant material into nanofibrils or nanocrystals. Pulping steps of delignification and bleaching are commonly used and a skilled person would readily understand that there are a number of delignification steps and bleaching methods that may be used in the present invention.

Delignification may be achieved by contacting the plant material with alkaline reagents such as sodium hydroxide or potassium hydroxide, or by contacting the plant material with organic solvents such as ethanol, acetone, toluene and/or methanol, typically at elevated temperatures and possibly elevated pressures. Bleaching will typically involve contacting the plant material with an oxidising agent such as peroxide, sodium chlorite or sodium hypochlorite, often in the presence of other chemicals and at elevated temperatures.

Following harvesting, the plant material may be subject to a size reduction step, such as by chopping or grinding the plant material to obtain particles of plant material having a longest dimension of less than 10 mm, prior to pulping. This step makes the long grass easier to process by enhancing flowability but is not considered essential to the production of nanocellulose of the present invention.

The plant feedstocks used to produce nanocellulose according to the present invention may have a high hemicellulose content of 30% or greater. In such cases, this high hemicellulose content may be also observed in the resulting nanocellulose materials. Accordingly, one embodiment of the invention consists in nanocellulose materials which have a hemicellulose content of 30% (w/w) or greater. Whereas cellulose is a strong and crystalline material, hemicellulose has an amorphous structure with little strength. Within plants, hemicellulose exists between adjacent cellulose fibrils and providing some binding capacity, acting as a glue.

Without being limited by theory, the inventors believe that the high hemicellulose content in the nanocellulose of the present invention may contribute to the observed flexibility of the cellulose nanofibrils and nanocrystals and the high toughness of the nanocellulose and interlocking networks formed from the nanocellulose such as those found in paper sheets made from the nanocellulose of the present invention. Here, hemicellulose may be acting as a glue or cross-linker between cellulose fibres or crystals, increasing the toughness and energy required to bring about mechanical failure of the material.

The different processing steps involved in the manufacture of the nanocellulose of the present invention may cause a change in the hemicellulose content of the material as it moves through chemical and mechanical processing steps. In general, hemicellulose content may be altered during delignification and bleaching steps however mechanical processing is less likely to cause a change in hemicellulose content. As a consequence, the hemicellulose content of the nanocellulose final product can be the same as the processed pulp prior to mechanical processing.

Accordingly, another embodiment of the present invention consists in nanocellulose with a hemicellulose content of 30% (w/w) or greater. In some embodiments, the nanocellulose has a hemicellulose content of from 30 to 55% why, or from 35 to 50% w/w, or from 37 to 48% w/w, or from 38 to 46% w/w or from 40 to 44% w/w, or any intermediate range within the ranges set out above.

In another embodiment, the present invention consists in nanocellulose with a hemicellulose content of 30% (w/w) or greater and an average fibre or particle diameter of 10 nm or lower. The average diameter of the nanocellulose fibres or particles may be within the ranges given in paragraph [0023] above. The aspect ratio may be greater than 250 and within the ranges given in paragraph [0020] or [0022] above.

Table 2 be compares the chemical composition of NFC materials obtained from a number of different plant feedstocks and using different processing routes as reported in the scientific literature.

TABLE 2

Comparison chemical composition of NFC obtained from different sources and treatments of cellulose.

| Source of cellulose | Mechanical treatment | NFC/MFC Diameter (nm) | Cellulose (%) | Hemicellulose (%) | Lignin (%) | Ref |
| --- | --- | --- | --- | --- | --- | --- |
| Bamboo fibre | Ultrasonication | 30-80 | 93.3 | 6.7 | 0.1 | 1 |
| Sugar-beet pulp | Ultrasonication and homogenization | 2-15 | 80.33 | 6.9 | — | 2 |
| Sugar beet pulp | Homogenization | 20-70 | 82.83 | 7.01 | 0 | 3 |
| Abaca | Homogenization | 20 | 86.84 | 13.5 | — | 4 |
| Hemp | Homogenization | 30-50 | 91.50 | 8.51 | — | 4 |
| Bleached *eucalyptus* fibre | Ultrasonication and homogenization | 1000-5000 | 80.35 | 13.52 | 0.20 | 5 |
| Softwood bleached kraft pulp | TEMPO-oxidation and ultrasonication homogenization | 3-4 | 90 | 10 | — | 6-8 |
| Bleached *eucalyptus* pulp | Disc refiner, knife mill and sonication | 20-50 | 85.2 | 13.9 | 0.1 | 9 |
| Empty Palm Fruit Bunch Fibers | PFI mill and microflouidization | — | 75.8 | 6.2 | 9 | 10 |

TABLE 2-continued

Comparison chemical composition of NFC obtained from different sources and treatments of cellulose.

| Source of cellulose | Mechanical treatment | NFC/MFC Diameter (nm) | Cellulose (%) | Hemicellulose (%) | Lignin (%) | Ref |
|---|---|---|---|---|---|---|
| Wheat straw | Cryocrushing and homogenization | 10-80 | 84.6 | 6 | 9.4 | |
| Wood pulp | Masuko grinder | 4-5 | 41.8 | 26.9 | 30.6 | 11 |
| Holocellulose pulp | Masuko grinder | 10-20 | 77.7 | 21.4 | 0.1 | 11 |
| Alkali treated pulp | Masuko grinder | 10-20 | 82.5 | 17.4 | 0.1 | 11 |
| 70% *Eucalyptus nitens* and 30% *Eucalyptus globulus* | TEMPO-oxidation and homogenization | — | 78.1 | 22 | — | 12 |
| *Pinus Radiata* fibres | TEMPO-oxidation and homogenization | — | 87.8 | 12.2 | — | 12 |

REFERENCES OF TABLE 2

1. Chen, W.; Yu, H.; Liu, Y. *Carbohydrate Polymers* 2011, 86, (2), 453-461.
2. Agoda-Tandjawa, G.; Durand, S.; Berot, S.; Blassel, C.; Gaillard, C.; Gartner, C.; Doublier, J. L. *Carbohydrate Polymers* 2010, 80, (3), 677-686.
3. Li, M.; Wang, L.-j.; Li, D.; Cheng, Y,-L.; Adhikari, B. *Carbohydrate Polymers* 2014, 102, (0), 136-143.
4. Alila, S.; Besbes, I.; Vilar, M. R.; Mutjé, P.; Bouti, S. *Industrial Crops and Products* 2013, 41, (0), 250-259.
5. Urruzola, I.; Serrano, L.; Llano-Ponte, R.; Ángeles de Andrés, M.; Labidi, J. *Chemical Engineering Journal* 2013, 229, (0), 42-49.
6. Qua, E. H.; Hornsby, P. R.; Sharma, H. S. S.; Lyons, G. *Journal of Materials Science* 2011, 46, (18), 6029-6045.
7. Isogai, T.; Saito, T.; Isogai, A. *Cellulose* 2011, 18, (2), 421-431.
8. Fukuzumi, H.; Saito, T.; Iwata, T.; Kumamoto, Y.; Isogai, A. *Biomacromolecules* 2008, 10, (1), 162-165.
9. Tonoli, G. H. D.; Teixeira, E. M.; Corrêa, A. C.; Marconcini, J. M.; Caixeta, L. A.; Pereira-da-Silva, M. A.; Mattoso, L. H. C. *Carbohydrate Polymers* 2012, 89, (1), 80-88.
10. Ferrer, A.; Filpponen, I.; Rodriguez, A.; Laine, J.; Rojas, O. J. *Bioresource Technology* 2012, 125, 249-255.
11. Iwamoto, S.; Abe, K.; Yano, H. *Biomacromolecules* 2008, 9, (3), 1022-1026.
12. Spence, K. L.; Venditti, R. A.; Rojas, O. J.; Habibi, Y.; Pawiak, J. J. *Cellulose* 2011, 18, (4), 1097-1111.

Hemicellulose content and the content of other lignocellulosic components was measured by chemical analysis. Specifically, TAPPI standard methods were used to characterize the components present in *spinifex* grass samples before and after pulping. Initially, *spinifex* water-washed grass and fibre samples were ground to 60 mesh fibre size using a small Wiley mill. Then the ground fibre samples were extracted with ethanol in a Soxhlet apparatus (Tecator Soxtec System Model HT 1043, from Foss, Denmark) for one hour followed by rinsing with water for another hour. The total lignin content was determined using the standard methods (TAPPI, Acid-insoluble lignin in wood and pulp, modified method based on Test Method T-222 om-88, 1988; TAPPI, Acid-soluble lignin in wood and pulp, Useful Method UM-250, 1991). Monomeric sugars also were determined by ion chromatography according to the reference Pettersen, R. C.; Schwandt, V. H. *Journal of wood chemistry and technology* 1991, 11, (4), 495-501.

In their natural state, cellulosic materials including nanocellulose have a surface chemistry dominated by hydroxyl (OH) groups, as these are natural constituents of the polysaccharides that make up cellulose. Some chemical treatments used by other groups to facilitate the production of cellulose nanofibrils from plant feedstocks result in modification of the surface functionality of the cellulose. For example, the TEMPO oxidation process results in a highly carboxylated cellulose nanofibrils surface. Since the process of the present invention may be performed without the use of harsh chemical agents, the hydroxylated surface of natural cellulose may be retained in the product cellulose nanofibrils.

Accordingly, one embodiment of the invention consists in nanocellulose with high aspect ratio, a mean fibril diameter of 10 nm or lower and a surface dominated by hydroxyl groups.

Nanocellulose in accordance with the present invention may be used in many applications, including, in materials, composites, packaging materials, and coatings. Numerous other applications may al so be available.

Nanocellulose material in accordance with the present invention may be particularly useful for manufacturing composite materials (including composites made by mixing the nanocellulose material with polymeric material to form a polymeric composite material) and paper made from the nanocellulose material.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

EXAMPLES

Pulping

The following examples used plant material derived from Australian arid *spinifex* (*Triodia pungens*). For pulping the plant material, the material was chopped to a particle size of less than 10 mm to enable easier processing and the natural fibre or cellulose fibre part was separated by delignification. In some cases delignification was followed by a bleaching treatment. The general process for pulping the plant material is shown in FIG. 5. For delignification, the fibres were first treated with either alkaline solution of low concentration or organosolv at higher temperature.

Delignification of Spinifex Grass

Delignification was done using two different methods;

Organosolv: In this treatment a 40 w/v % ethanol solution is combined with the grass in a 2.5:1 solvent grass (v/w) ratio at 185° C. was applied for 2 hours under the pressure in an autoclave then washing was performed using a 1 M NaOH solution and finally water. This procedure was repeated once more in order to pull out the residual lignin from between the fibrils.

Alkaline treatments: In alkali treatment *spinifex* grass was subjected to alkaline solution of 2 wt % NaOH with the solvent to grass ratio of 10:1 at 80° C. for 2 hours, then filtered and washed with water.

Bleaching Spinifex Grass

For bleaching delignified fibres, a 1 wt % aqueous solution of sodium chlorite at 70° C. and pH=4 (pH adjusted using glacial acetic acid) was used for an hour with 30:1 solvent to grass mass ratio under stirring until white point which the coloured substances were removed from the grass.

Table 3 below shows the composition of lignocellulosic components in *Triodia pungens* grass following washing in water and different stages in the pulping process. It was observed that prior to chemical processing (pulping) the *Spinifex* grass had a hemicellulose content of 44% (w/w) and this reduced to 43% and 42% following delignification and bleaching steps respectively. In all cases, these percentage amounts are percentages of the total lignocellulosic mass of the material. Interestingly, the hemicellulose content does not decrease significantly on delignification or bleaching of the water-washed grass, allowing the high hemicellulose content of the grass to be carried through to the final nanocellulose product. This may be a result of the very mild delignification and bleaching conditions used in the method of the present invention.

TABLE 3

Composition of lignocellulosic components in water-washed and pulp of *T. pungens* grass.

| Treatments | Cellulose % (w/w) | Hemicellulose % (w/w) | Lignin % (w/w) |
|---|---|---|---|
| Water-washed | 33 | 44 | 23 |
| Alkali delignified | 31 | 43 | 26 |
| Alkali delignified and bleached | 55 | 42 | 3 |
| Organosolv delignified | 40 | 34 | 26 |
| Organosolv delignified and bleached | 60 | 34 | 8 |

Figure 15:
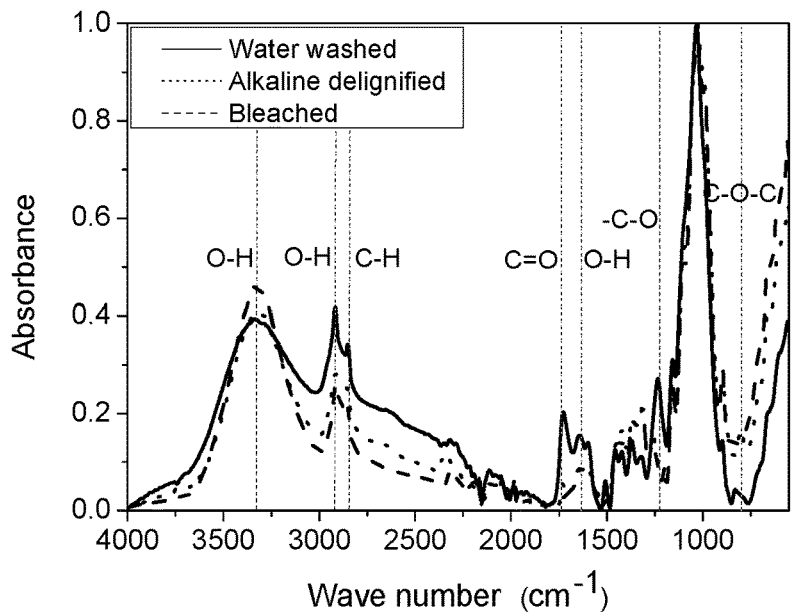
FIG. 15 shows ATR FTIR spectra of *T. pungens* fibres in their virgin state (water washed), after alkaline delignification and after bleaching.

The ATR FTIR spectra for water-washed, delignified and bleached *T. pungens* fibres shown in FIG. 15 feature a main broad peak within the wave number range of 3000-3650 cm-1, which confirms stretching vibrations of hydroxyl (OH) groups as the principal functional group in these lignocellulosic materials.

Example 1—Higher Aspect Ratio Nanofibers From Spinifex Via Acid Hydrolysis

Sulphuric acid hydrolysis is a suitable chemical method for isolating cellulose nanocrystals, due to high yield and the surface charges (sulphate) created after the hydrolysis, which can facilitate the dispersion in water and other polar solvents. In a typical prior art procedure, the acid concentration varies from 35 to 65% and the temperature varies from 40 to 100° C., depending on the source. In general, if a low range of acid concentration is used, a higher temperature is used, and if a low temperature is used, a higher acid concentration is used. With *spinifex* grass, use of an acid concentration above 45% and a temperature above 50° C. resulted in detrimental effect on the hydrolysis, either charring or complete hydrolysis into low molecular sugars.

Different methods have been applied in the prior art to prepare cellulose nanocrystals. Each of these lead to different types of nanomaterial (e.g., shape, length, and diameter), depending on the source of the cellulose and the degradation process (e.g., controlled time, temperature and acid concentration), and also the applied pre-treatment. The main process in the preparation of cellulose nanocrystal (CNCs) is based on strong acid hydrolysis under strictly controlled conditions of temperature, agitation, and time to remove amorphous, disordered or para-crystalline regions and isolate crystalline domains with higher resistance to acid attack. Removing the amorphous region has shown improvement in the crystallinity and thermal stability of extracted rod-like nanocrystals.

Different concentrations of sulphuric acid solution at different temperatures were used for different times to characterize the effect of hydrolysis parameters on cellulose fibres properties.

The experimental results showed that we could successfully produce cellulose nanocrystals from *spinifex* grass using the minimum acid concentration and lowest temperature together (we used 35% sulphuric acid at 45° C.—the difference with our work is that we used the minimum for both conditions). Applying harsh treatment, such as more than 40% sulphuric acid (mostly 64% is using to hydrolysis different source of cellulose for producing cellulose nanocrystals) and higher temperature (above 50° C.), to *spinifex*-derived plant material damages the fibres and hydrolyses the cellulose into low molecular sugars glucose. It is worth noting that the nanocrystals obtained from *spinifex* grass have a very long length while the nanocrystals from the other sources of cellulose are short and straight. The highest known aspect ratio cellulose nanocrystals are obtained from marine animals called tunicates. Because of their rarity, the production of high aspect ratio CNCs is limited at a commercial scale. Production of high aspect ratio CNC s derived from plant sources was unknown prior to the present invention.

Figure 1:
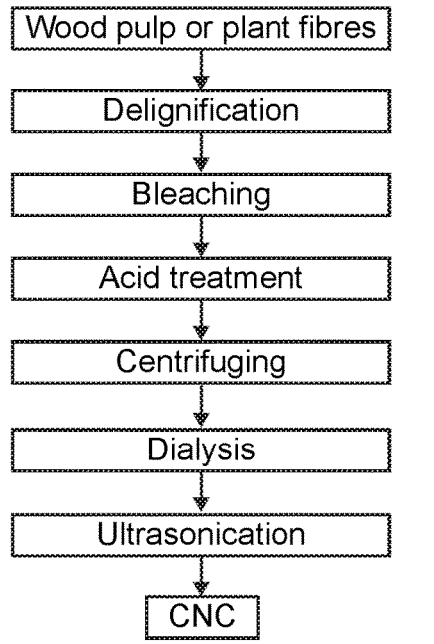
FIG. 1 is a flowchart showing the most commonly used general protocol for producing CNC in the prior art.
Figure 2A:
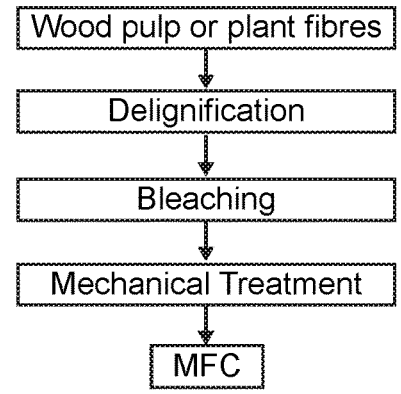
FIGS. 2A and 2B show a comparison between common established procedures for producing MFC (FIG. 2A) and common established procedures for producing NFC (FIG. 2B)
Figure 2B:
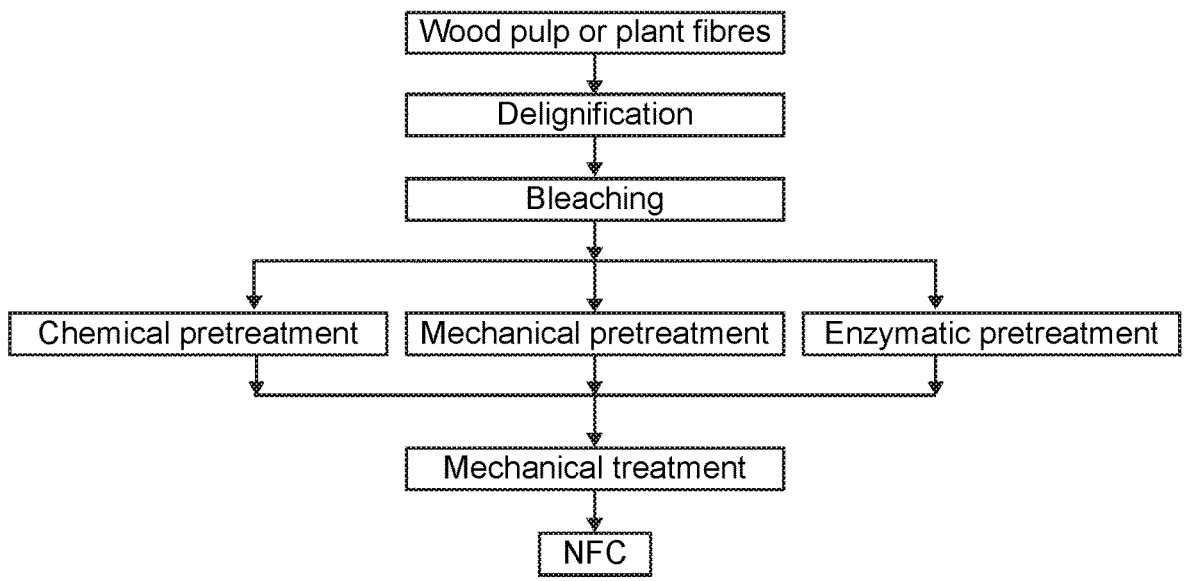
Figure 3:
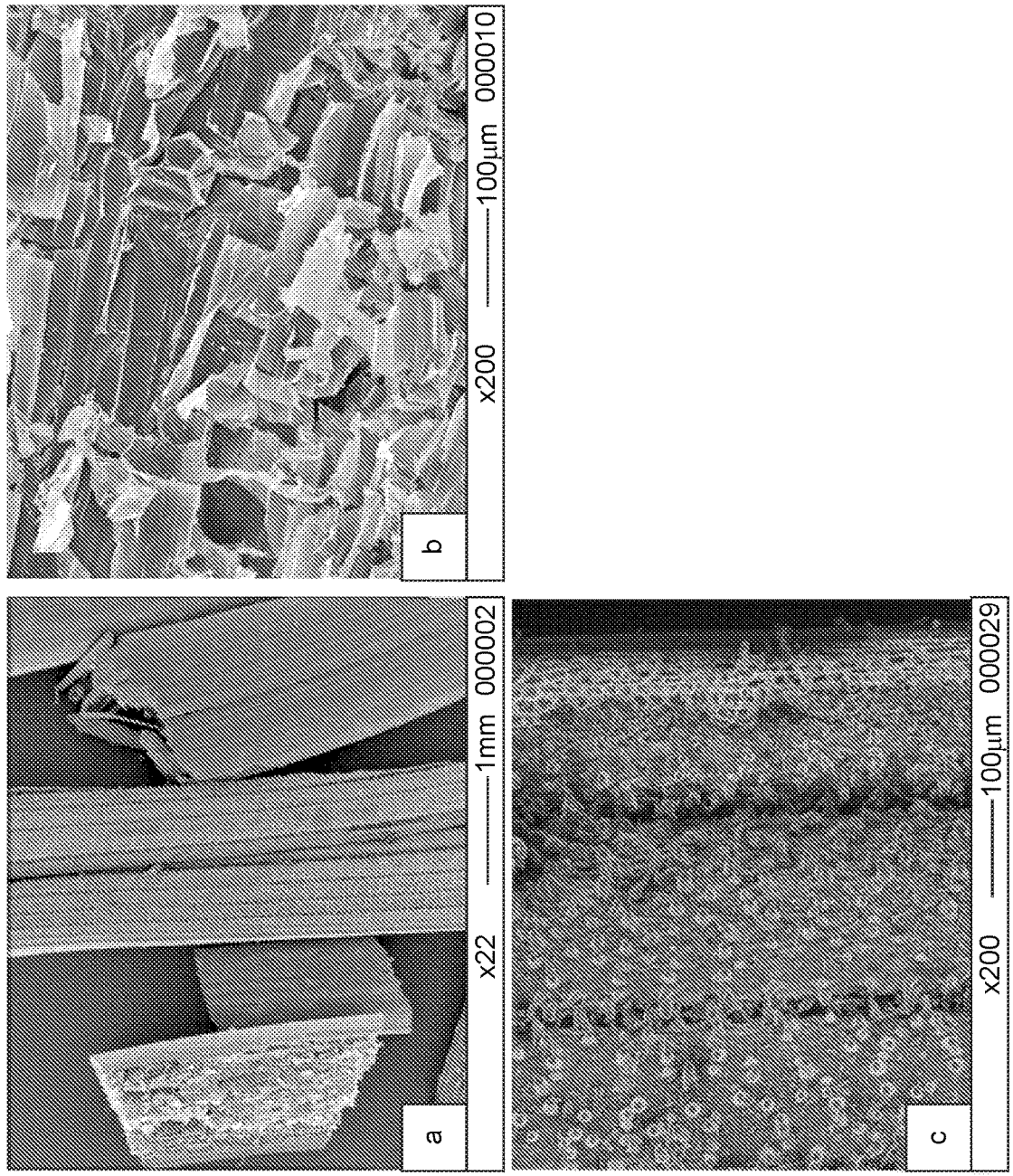
FIG. 3 shows SEM micrographs showing cross-sections of a native *Triodia* fibre; a) low magnification overview, b) parenchyma cells showing a high surface area, "flaky" morphology, and c) nodular structures.
Figure 4:
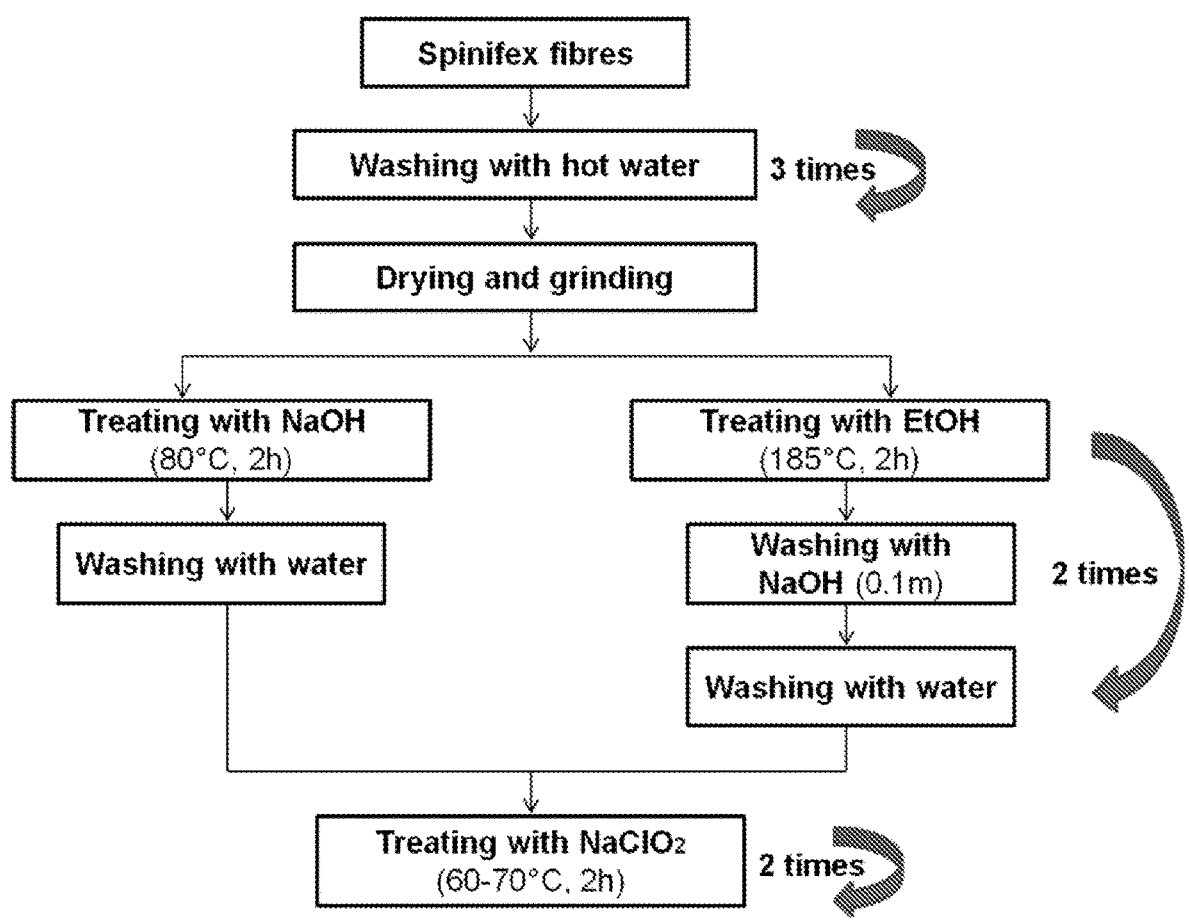
FIG. 4 shows an example process for plant feedstock preparation and pulping in the case that both delignification and bleaching are carried out, using plant material from *Triodia Pungens*.
Figure 5A:
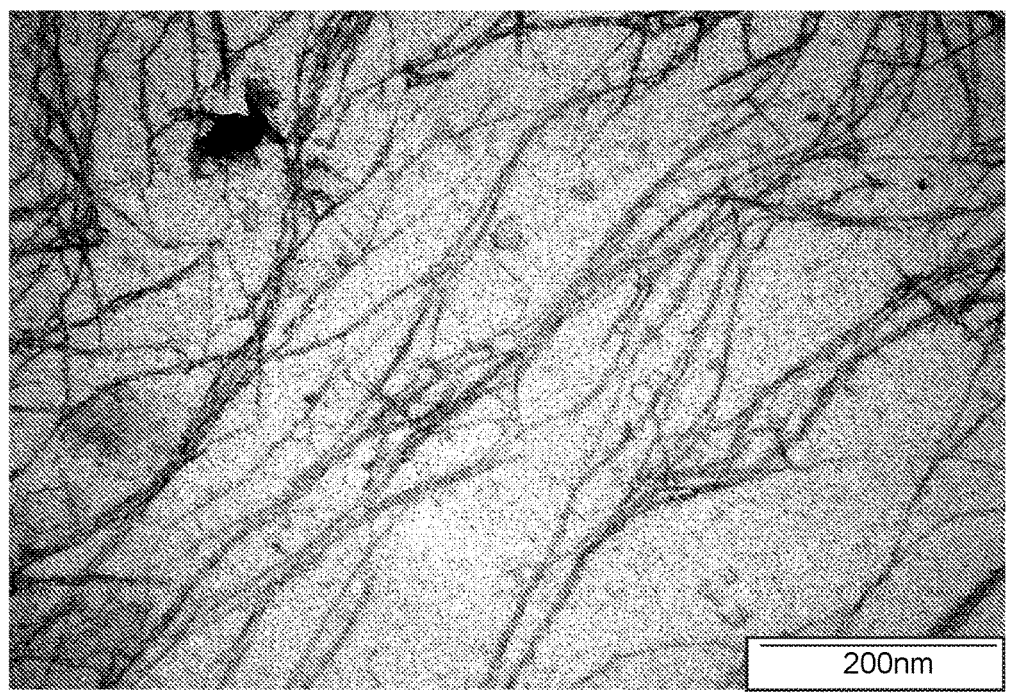
FIGS. 5A and 5B show TEM images of cellulose nanocrystals/fibrils obtained from bleached *spinifex* pulp via acid hydrolysis (40% sulphuric acid, at 45° C. for 3 h) (scale bar: 200 nm). The average diameter of acid treated fibres in FIG. 5A is 4±1.4 nm. The nanocellulose of FIG. 5B had an average diameter of 3.4±0.78 nm.
Figure 5B:
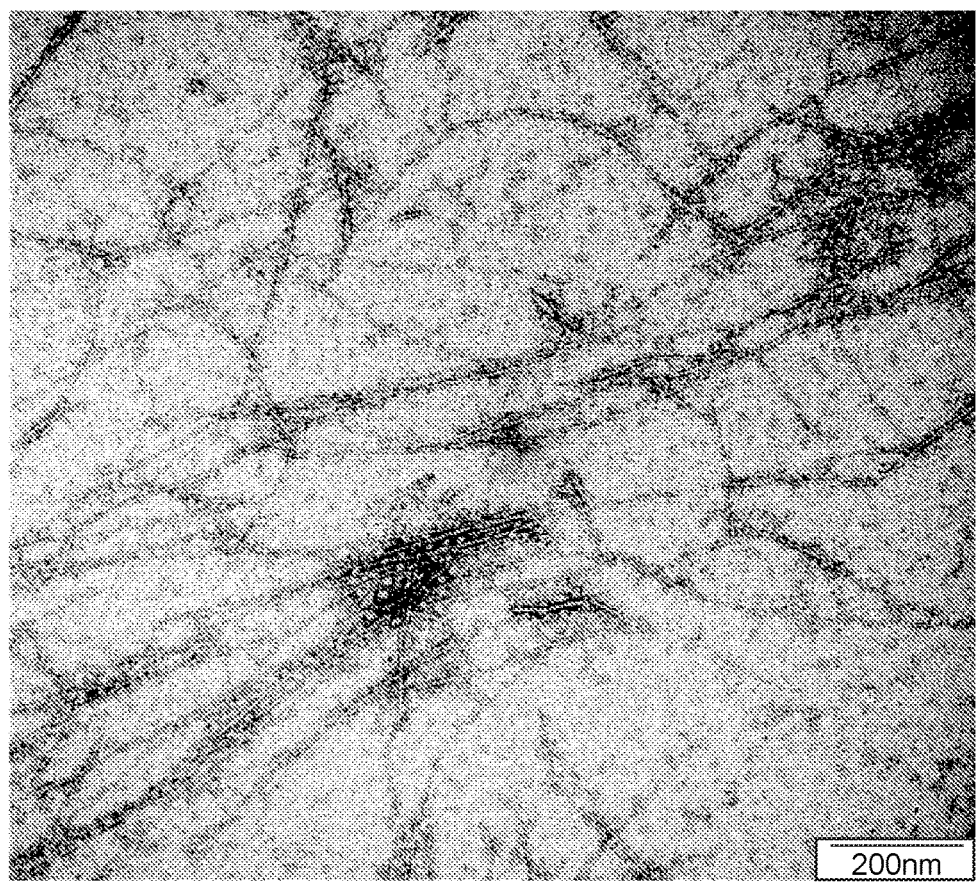

FIGS. 5A and 5B show TEM image of cellulose nanocrystals/fibrils obtained from bleached *spinifex* pulp via acid hydrolysis (40% sulphuric acid, at 45° C. for 3 h) (scale bar: 2 μm) as used in Example 1. The average diameter of acid treated fibres in FIG. 5A is 4±1.4 nm. A measurement of shorter fibres of an acid treated fibres which we could find the start and end point in FIG. 5B shows the average diameter of 3.4±0.78 nm.

Example 2—Small Diameter Nanofibers From Spinifex Via Homogenisation

Figure 6A:
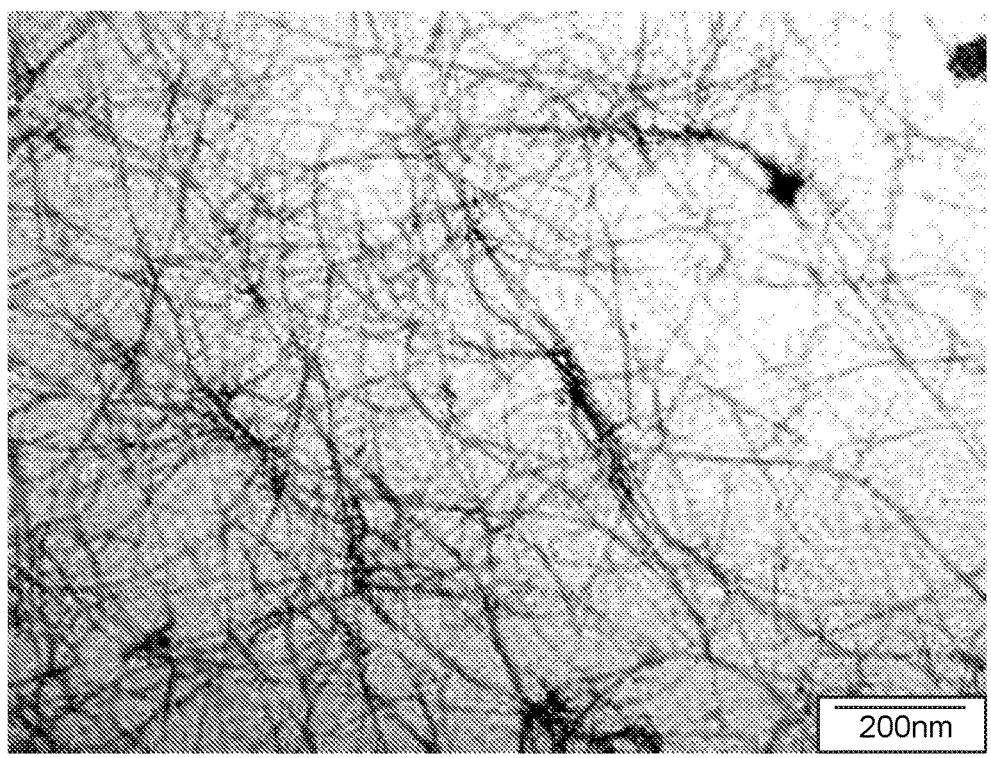
FIG. 6A shows a TEM image of the nanofibers obtained from *spinifex* after 1 pass through a HPH with the pressure of 1500 bar and FIG. 6B shows a TEM image of the nanofibers obtained from *spinifex* after 5 passes through HPH with the pressure of 1500 bar (scale bar is 200 nm in both cases)
Figure 6B:
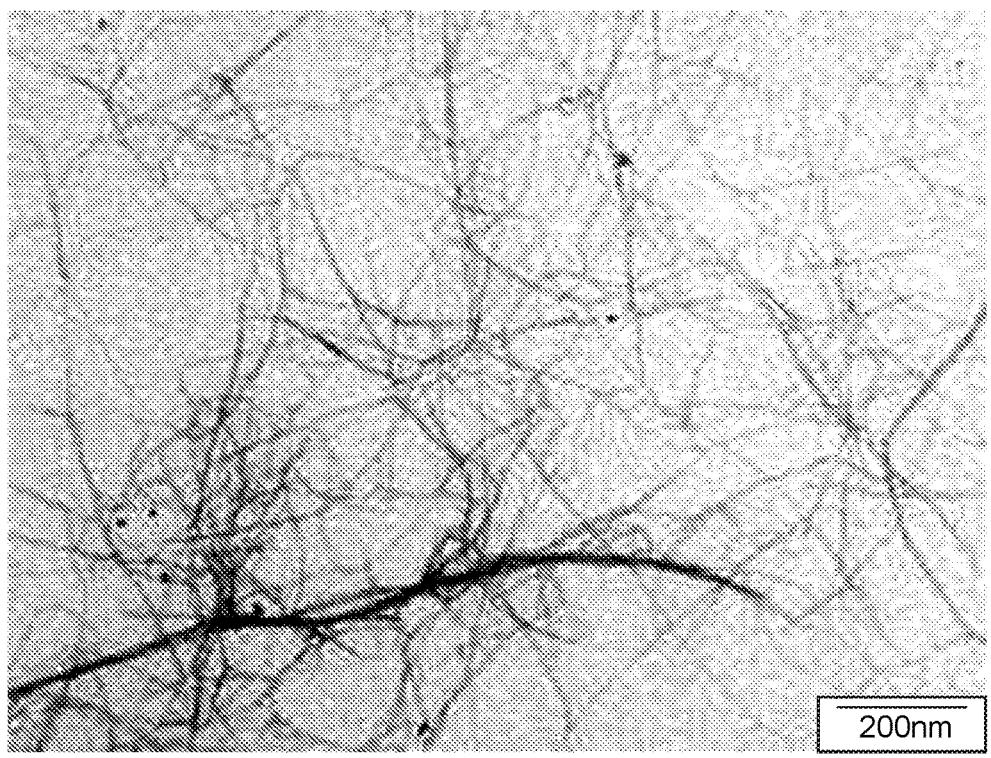

To obtain nanofibrillated cellulose (NFC), aqueous suspensions of delignified (alkaline route) and bleached *spinifex* pulps (42% hemicellulose content) were homogenized using a high pressure homogeniser (EmulsiFlex-C5 homogenizer) at different solids loadings (0.1, 0.3 and 0.7% w/v) and at different pressures (1500, 1000, 350 bar). FIG. 6 shows the TEM images of the obtained nanofibers with the average width of about 3.5 nm after 1 pass (FIG. 6A) and 5 passes (FIG. 6B), through the homogeniser. Hemicellulose content was 42%.

Obtaining a homogeneous suspension of nanofibers within a few number of passes with 100% yield has been beneficial. Unlike fibres from other source, there was no clogging issue encountered even after increasing the number of passes up to 15, suggesting the nanofibres could be obtained with lower energy consumption. Efficiency of this process may be further increased by increasing the solid content in suspension.

Example 3—Agglomerated Nanofibres From Spinifex Via High-Energy Ball Milling

Figure 7:
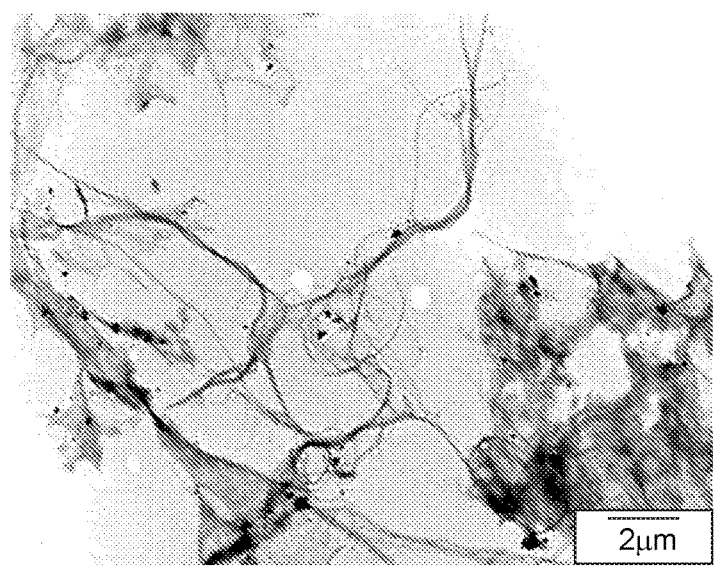
FIG. 7 shows a TEM image of the suspension obtained after milling a *spinifex* bleached pulp at 1500 rpm for 30 min in circulating setup in a ball mill. The nanofibers have a diameter of 42±24 nm and a length of a few microns (scale bar: 2 µm)

As a scalable method to produce cellulose nanofibres (fibrils/crystals), we investigated high-energy ball milling (Netsch-Labstar 10, diameter of the milling chamber: 97 mm, volume of balls: 400 ml (including the interstitial space between the balls), media for grinding: water, loading of suspension: 400 ml, volume of grinding chamber: 620 ml). There have been few reports made using lab-scale (1 to 5 g scale) ball milling. Our method/set-up relies on large-scale processing. FIG. 7 shows the nanofibres (width 42±24 nm) obtained from milling a delignified (alkaline) and bleached pulp (42% hemicellulose content) at 1500 rpm (lower energy) after 30 min of circulation.

Figure 8:
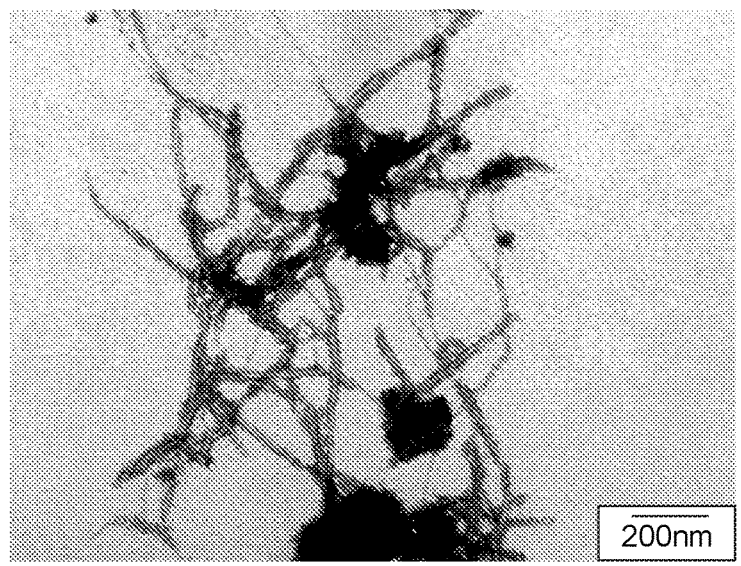
FIG. 8 shows a TEM image of the suspension obtained after milling a *spinifex* bleached pulp at 3000 rpm for 20 min in batch setup showing nanofibers with a diameter of 8±2 nm and length of 341±100 nm (scale bar: 200 nm)

In another example, a pulped suspension was milled at 3000 rpm for 20 min of batch setup (high energy). FIG. 8 TEM of the resulting suspension showing the nanofibres (width was 8±2 nm, length was 341=100 nm) (scale bar: 200 nm). This also suggests that by applying higher energy we could further break down the nanofibres into shorter nanocrystals.

Example 4—NFC Preparation Using High-Pressure Homogenizer

A slurry of Spinifex pulp (alkaline delignified and bleached fibres) (42% hemicellulose) was passed through a high-pressure homogenizer (EmulsiFlex-C5.Homogenizer) This homogeniser rapidly reduces particles size from micron to nanometer scale based on the principle of dynamic high-pressure homogenisation. During the preparation of NFCs, it was found that high-pressure homogenization has a noticeable effect on the diameter of fibres. The NFCs showed a complex, web like structure. Different shape of twisted/untwisted, and curled/straight nanofibrils have the diameter less than 7 nm and several microns length even after only 1 pass through homogenizer.

Figure 9:
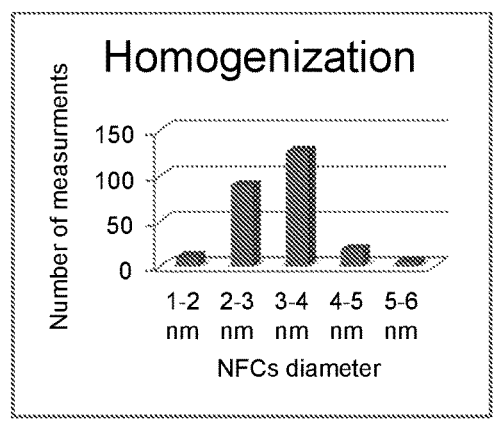
FIG. 9 is a graph showing dispersity of dimensions (diameter) of *spinifex* derived nanofibrils obtained with only a single pass through a high pressure homogenizer, based on a total of 250 measurements.

Applying different pressure, different slurry concentration and also different numbers of passes exhibited almost the same results on fibrils diameter and length (Table 4). All nanocellulose products had 42% hemicellulose content. In case of higher pressure, more fibrillation was observed. The most important issue when thinking about an up-scaling of the nanofibrillated cellulose production in industry is the energy consumption. So recently, several researchers have focussed on the development of less energy consuming disintegration methods using enzymatic, chemical or mechanical pre-treatment. In our process with *spinifex* grass, homogenisation of bleached pulp produces NFC even at first pass through the homogenizer without any clogging issues. Since the fibres were already well-fibrillated into nanoscale material at first pass, further homogenisation did not show any clogging and it only helped to fibrillate into a few nanometers. In other words, it was easier to fibrillate into nanoscale fibres at first pass (FIG. 9) whereas in the reported papers, a minimum of 6 passes or treating with acid/alkaline/polyelectrolyte was usually performed to reduce the higher number of passes which is crucial in terms of energy consumption of the process 2-4.

TABLE 4

Average diameter of nanofibres obtained by homogenization

|  | 0.1 wt %, 1 pass | 0.3 wt %, 1 pass | 0.3 wt %, 5 pass | 0.3 wt %, 10 pass | 0.3 wt %, 15 pass | 0.7 wt %, 1 pass |
|---|---|---|---|---|---|---|
| 1500 bar | 3.2 ± 0.7 | 3.5 ± 0.8 | 3.2 ± 0.7 | 3.3 ± 0.8 | 3.2 ± 0.8 | 3.7 ± 0.7 |
| 1000 bar | 3.5 ± 0.6 | — | — | — | — | — |
| 350 bar | 3.7 ± 1 | 3.7 ± 1 | — | — | — | — |

Figure 10A:
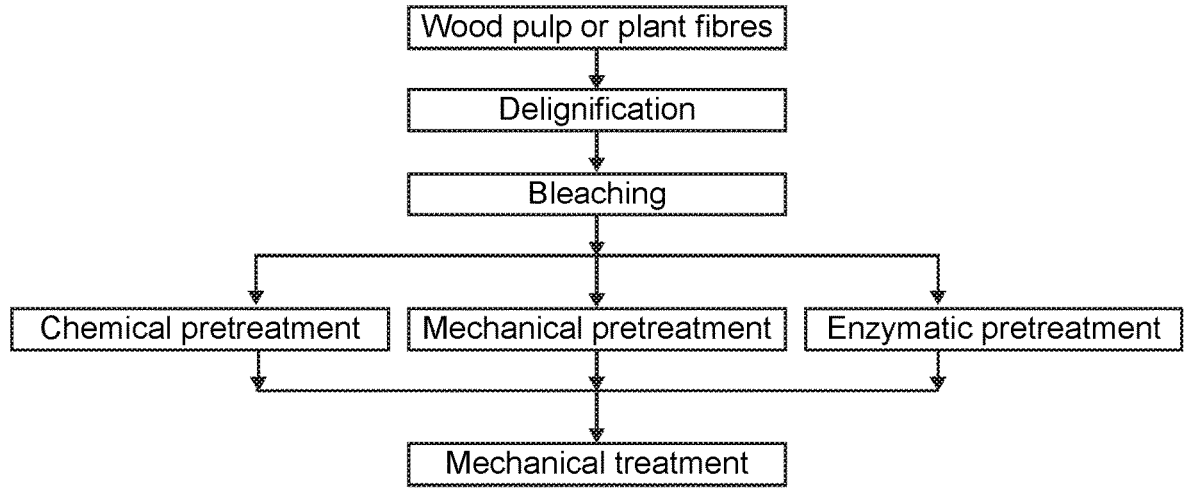
FIGS. 10A and 10B are process flowcharts showing a comparison of a commonly established procedure for producing NFC (FIG. 10A) and a process for producing NFC from *spinifex* grass using a method in accordance with an embodiment of the present invention (FIG. 10B)
Figure 10B:
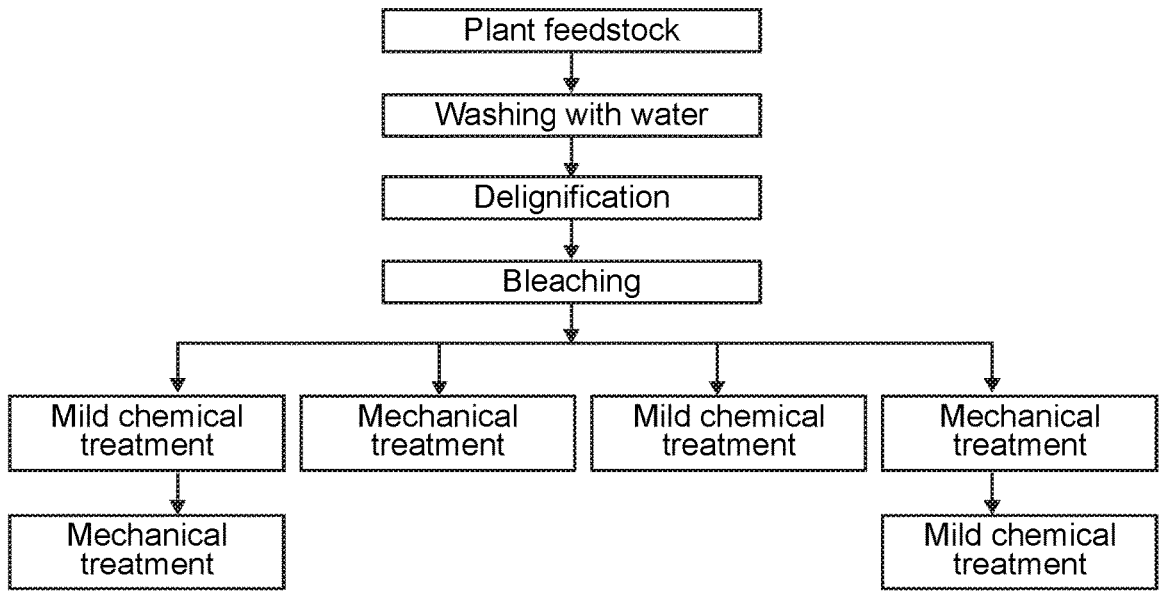

Process flowcharts in FIGS. 10A and 10B showing a comparison of the common established procedures for producing NFC and a process for producing NFC from *spinifex* grass using a method in accordance with an embodiment of the present invention. As can be seen, in the process of the present invention (FIG. 10B), the steps of chemical pre-treatment, mechanical pre-treatment and/or enzymatic pre-treatment can be omitted.

With bleached ethanol and alkali treated *spinifex* feedstock, the present inventors were able to produce NFCs using considerably fewer (1) passes compared with ~20 passes for cotton-derived feedstock prepared using much harsher multistep pretreatment steps. i.e. an order of magnitude larger energy and time required to obtain a much lower aspect ratio product. Furthermore, with *spinifex* the HPH could practically be run at higher suspension concentration without clogging, meaning much higher potential yields.

Example 5—MFC Preparation Using High-Energy Milling, and Resultant Dimensions

Figure 11:
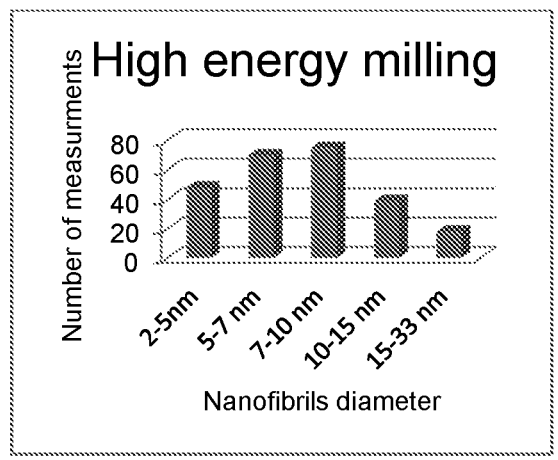
FIG. 11 shows a graph of dispersity of dimensions (diameter) of fibrils obtained from a *spinifex* bleached pulp via high energy milling (see Example 5)

The milling of *spinifex* grass was performed in which a slurry of bleached *spinifex* pulp in only water was subjected to the high-energy milling (Netzsch Laboratory agitator based mill LABSTAR). FIG. 11 shows a graph of dispersity of dimensions (diameter) of fibrils obtained via high-energy milling.

This example demonstrates extraction of cellulose from *spinifex* grass using a high-energy milling while the crystallinity of obtained nanofibrils and structure of cellulose didn't change. The nanofibrils have the diameter in the range of below 40 nm and several microns length (FIG. 11).

Figure 12:
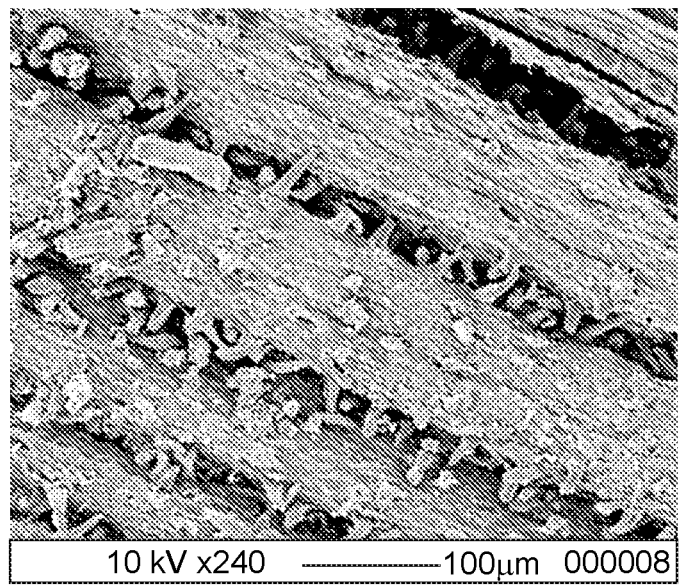
FIG. 12 shows an SEM image of *spinifex* grass delignified via alkali treatment at 80° C.
Figure 13:
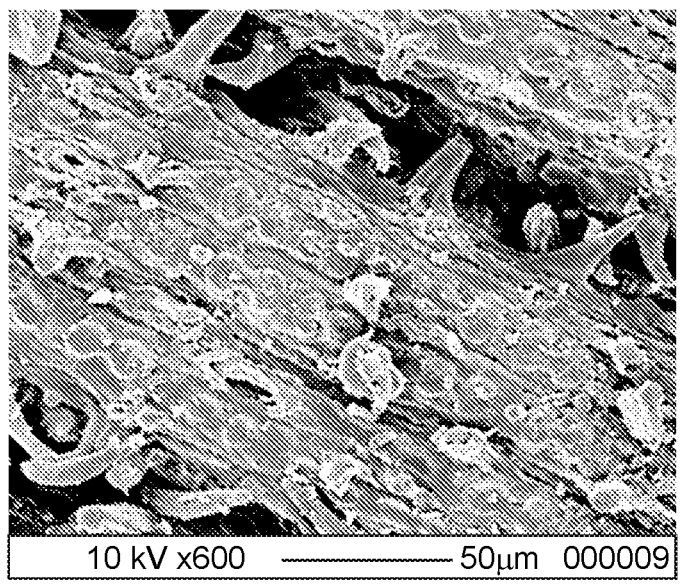
FIG. 13 shows SEM images of the delignified *spinifex* grass obtained via organosolv treatment at 185° C.

Without wishing to be bound by theory, the present inventors believe that the milder conditions or lower energy (for chemical or mechanical methods) required for defibfillating/micronising the *spinifex* grass fibers into nay is likely to be attributable to the structural morphology of the fibers. FIGS. 12 and 13 show SEM images of *spinifex* fiber after delignification via alkali and organosolv treatment respectively. The morphology of the fibers suggests the elementary fibrils are intertwined and stacked to form microfibres which are connected together with hollow tube-like channel.

It is assumed that fibres with this morphology may have evolved to adapt to the harsh drought conditions and to reduce the water evaporation.

For a *spinifex* NFC sample prepared via 1 pass through the high-pressure homogenizer at 1500 bar, the following dimensions were measured. The average aspect ratio of nanofibrils with an average width/diameter of 32±0.7 nm and an average length of 1686±591 nm is 527±185 (with lengths ranging between 266 and 958, as measured from TEM images taken at a higher magnification—noting some higher aspect ratio nanofibrils could not be measured due to the limited field of view). The average aspect ratio of larger diameter nanofibrils (or rather, larger bundles comprising several nanofibrils) with an average width/diameter of 10.69±3.9 nm and an average length of 5770±1700 nm is 540±166 (ranging from 305 to 727, as measured from TEM images taken at low magnification to cover the whole length—also noting that at low magnification, the measured average diameter may be overestimated, due to limited resolution, but still the NFC bundles which were visible showed an average 10.7 nm width).

Example 6—Preparation of Cellulose Nanopaper

Spinifex cellulose nanopaper was produced from an aqueous NFC suspension after vacuum filtration on a Büchner funnel fitted with a cellulose acetate membrane filter (pore size: 0.45 μm, diameter: 47 mm). The filtration was continued until the wet sheet of NFC was formed. The wet sheet was then dried using hot press trying at a temperature of 103° C. for 2 hours.

Mechanical testing of the *spinifex* nanopaper was performed at room temperature using an Instron model 5543 universal testing machine fitted with a 500 N load cell. A total of five replicates of each sample with dimensions of 25 mm in length and 6 mm in width were tested at 1 mm/min strain rate with a 10 mm gauge length. The Young's modulus was determined from the slope of the initial linear region of the stress-strain curves. Maximum tensile strength is the largest stress that a film is able to sustain against applied tensile stress before the film tears. Elongation at break is the maximum percentage change in the original film length before breaking, and work to fracture is measured as the area under the stress-strain curve.

The density of nanopaper was calculated by measuring dried paper's weight and dividing it by its volume calculated from the thickness by digital micrometer and its area. The corresponding porosity was estimated as the following Eq (1);

$$\text{Porosity} = 1 - \frac{\rho NFCpaper}{\rho \text{cellulose}} \quad (1)$$

Here $\rho_{NFC\ paper}$ and $\rho_{cellulose}$ represent density of the obtained NFC films and neat cellulose (1460 kg/m3), respectively.

Mechanical properties of the nanopaper made from *spinifex* nanofibrils (42% hemicellulose content) are set out in the Table 5;

TABLE 5

Mechanical properties of spinifex nanopaper produced by homogenization and dried with a hot-press at 103° C. for 2 h with no significant force

| Porosity (%) | Elastic Modulus (GPa) | Tensile Strain (%) | Tensile Strength (MPa) | Tensile Toughness (MJ/m³) |
|---|---|---|---|---|
| 22 | 3.2 | 18 | 84 | 12.3 |

Figure 14:
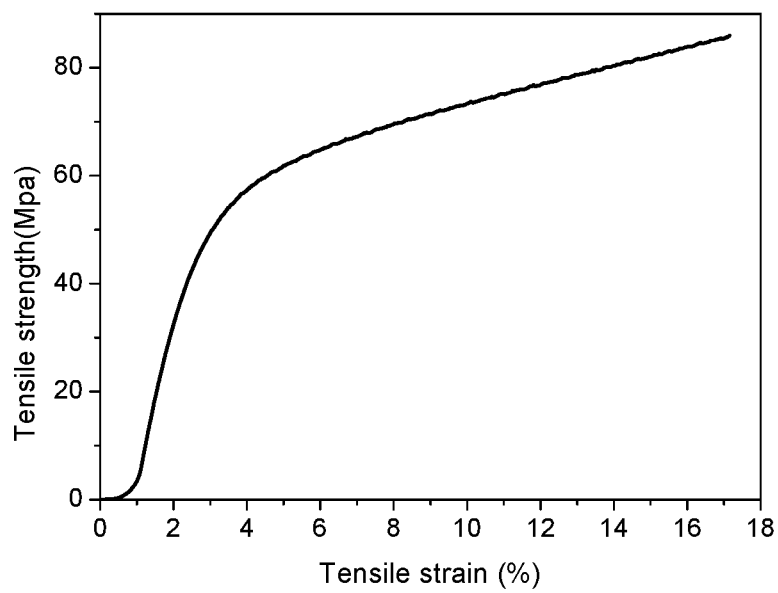
FIG. 14 shows a tensile curve of *spinifex* NFC paper produced by homogenization and dried with a hot-press at 103° C. for 2 h with no significant force applied during drying.

FIG. 14 shows tensile curves of *spinifex* NFC paper produced by vacuum filtration of homogenized nanofibrils and dried with a hot-press at 103° C. for 2 h. For a given nanopaper density, the present inventors believe that the overall toughness of this *spinifex* derived material (i.e. area under the tensile curve) is very impressive due to the entanglements of the long fibrils enabling quite a high plastic deformation before breakage.

Example 7—Silverson Processing of Bleached Pulp

Figure 16:
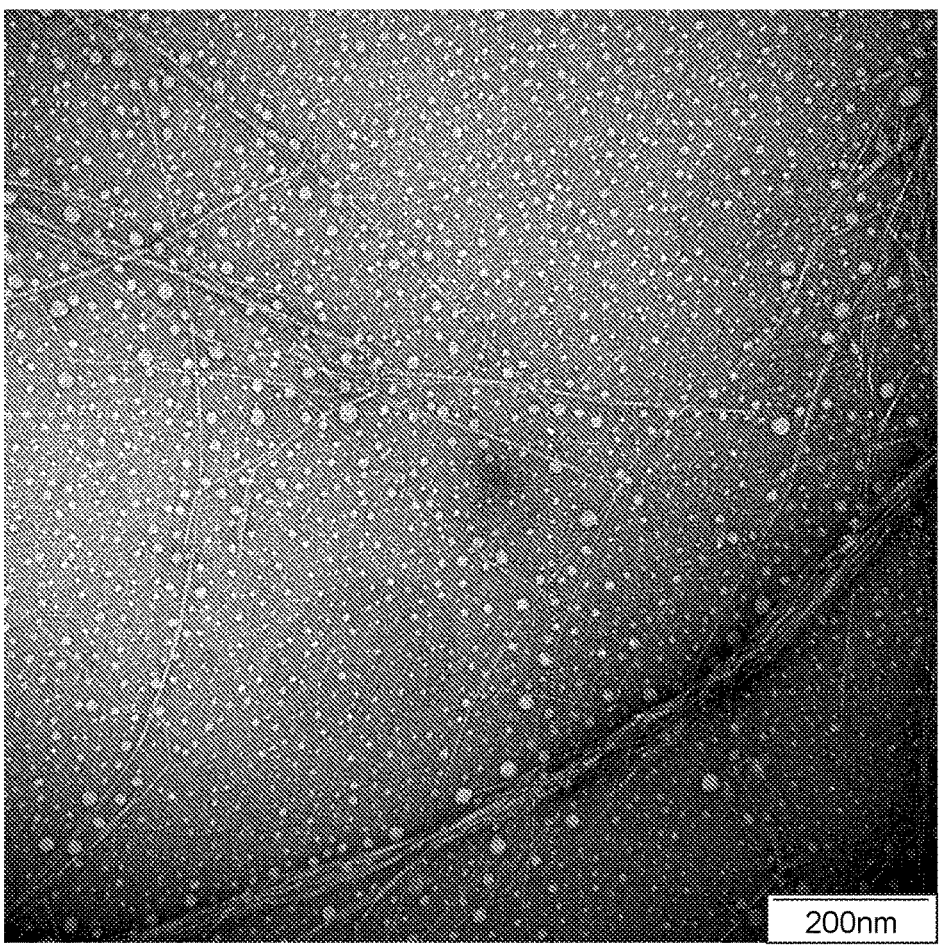
FIG. 16 shows cellulose nanofibrils produced by processing bleached pulp of *Triodia Pungens* in a Silverson rotor-stator unit. The scale bar is 200 nm.

An aqueous suspension of delignified (alkaline) and bleached *spinifex* pulp (42% hemicellulose) was subjected to processing through a Silverson rotor stator homogenising unit for 5 minutes at room temperature. As shown in FIG. 16, long cellulose nanofibrils with a diameter of 5.5±73 nm and 42% hemicellulose content were produced.

Example 8—HPH Processing of Silverson Processed Pulp

Figure 17:
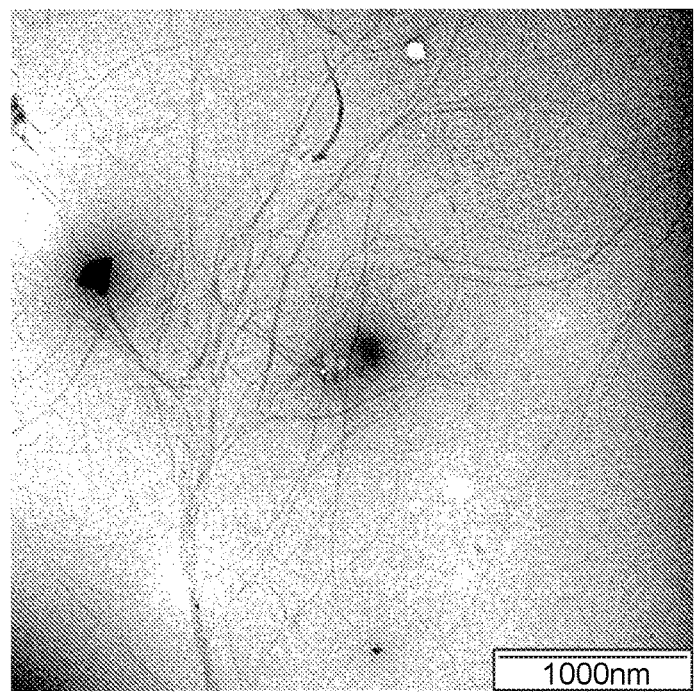
FIG. 17 shows cellulose nanofibrils produced by processing bleached pulp of *Triodia Pungens* in a Silverson rotor-stator unit followed by further mechanical processing in a high pressure homogeniser. The scale bar is 1000 nm.

An aqueous suspension of delignified (alkaline) and bleached *spinifex* pulp (42% hemicellulose) was subjected to processing through a Silverson rotor stator homogenising unit for 5 minutes at room temperature followed by a single pass through a high pressure homogeniser at 500 bar pressure. As shown in FIG. 17, long cellulose nanofibrils with a diameter of 8.7±3 nm and 42% hemicellulose content were produced. Scale bar is 1000 nm.

Example 9—Cellulose Nanofibrils Produced Without Bleaching

Figure 18:
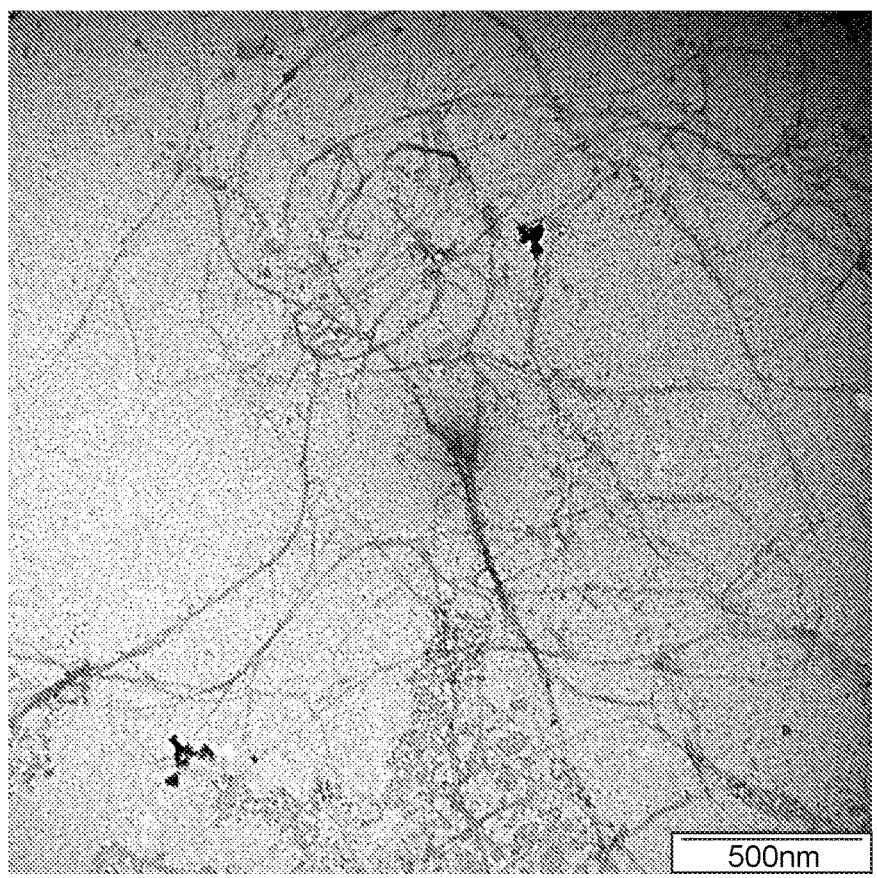
FIG. 18 shows cellulose nanofibrils from *Triodia Pungens* grass processed by alkaline delignification, followed by high pressure homogenisation at 500 bar pressure (no bleaching). The scale bar is 500 nm.

A sample of *Triodia pungens* grass was subjected to alkaline delignification. The delignified pulp (43% hemicellulose) was then passed through a high-pressure homogeniser at 500 bar pressure for a single pass only. The pulp was not bleached. As shown in FIG. 18, long cellulose nanofibrils with diameter of 6.8±0.23 nm and 43% hemicellulose content were obtained.

Example 10—Cellulose Nanofibrils Produced Without Bleaching

Figure 19:
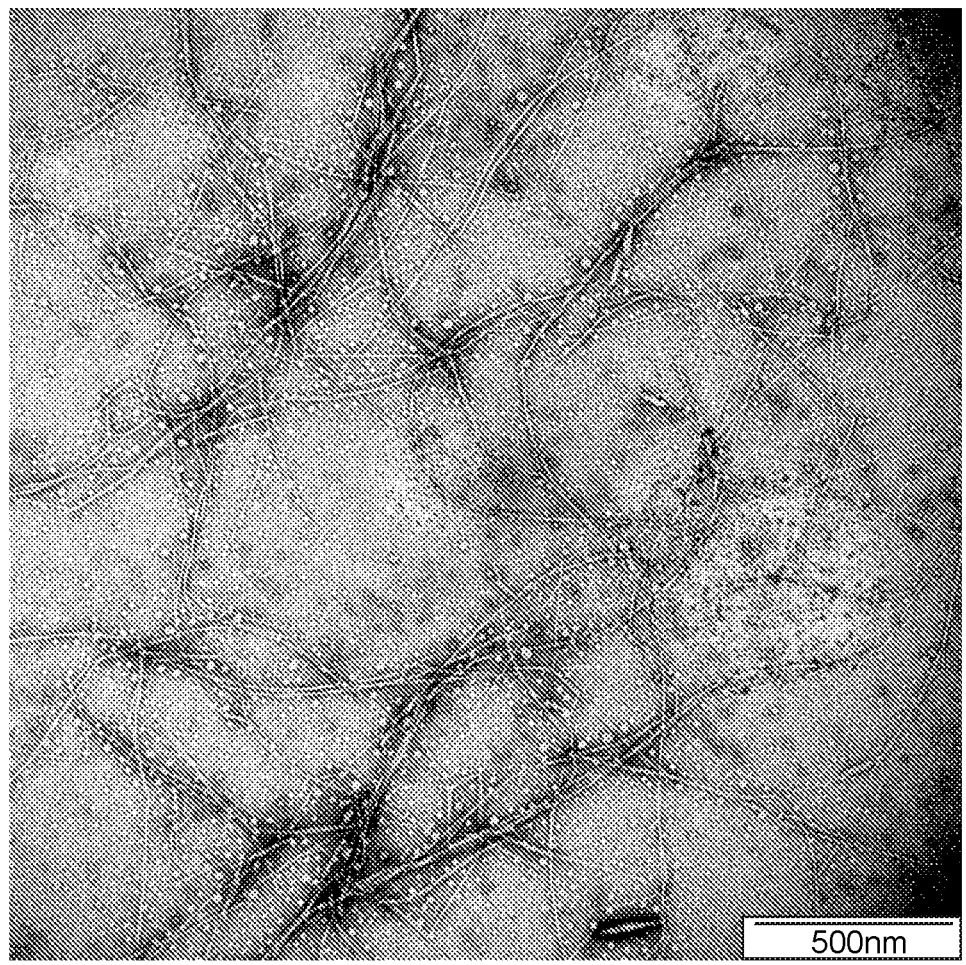
FIG. 19 shows cellulose nanofibrils from *Triodia Pungens* grass processed by alkaline delignification, followed by high pressure homogenisation at 700 bar pressure (no bleaching). The scale bar is 500 nm.

A sample of *Triodia pungens* grass was subjected to alkaline delignification. The delignified pulp (43% hemicellulose) was then passed through a high-pressure homogeniser at 700 bar pressure for a single pass only. The pulp was not bleached. As shown in FIG. 19, long cellulose nanofibrils with diameter of 3.9±1.3 nm and 43% hemicellulose content were obtained.

Aspect Ratio Method of Measurement

In the examples given in this specification, the following method was used to measure or determine aspect ratio:

Samples of *spinifex* cellulose nanofibrils in water were sonicated and 1 µl was spotted onto formvar coated Cu/Pd 200 mesh grids and allowed to dry. Samples were then stained with 2% uranyl acetate (aq) for 10 minutes in the absence of light then excess UA was removed and grids were allowed to dry. Grids were then examined on a JEOL 1011 TEM operating at 100 KV and captured on a SIS Morada 4K CCD camera system.

For each sample, 250 measurements of diameter were randomly selected and measured from several TEM images using digital image analysis (Image J).

For measuring the length of fibres, each TEM image was processed using AutoCAD software. This program allows contours to be manually drawn following the non-linear path of each cellulose nanofibre in xy space and contains tools for the subsequent calculation of contour length.

Throughout this specification, the following terms have the following meanings:

Microfibrillated cellulose (MFC): MFC is produced via mechanical refining of highly purified WF and PF pulps, have a high aspect ratio (20-100 nm wide, 0.5-10's µm in length), are 100% cellulose, and contain both amorphous and crystalline regions.

Wood Fibre (WF).
 (a) (Bot.) Fibrovascular tissue.
 (b) Wood comminuted, and reduced to a powdery or dusty mass.

Plant fibre (PF)—1: fibre derived from plants [syn: plant fibre, plant fibre]

Nanofibrillated cellulose (NFC): NFC particles are finer cellulose fibrils produced when specific techniques to facilitate fibrillation are incorporated in the mechanical refining of WF and PF have a high aspect ratio (3-20 nm wide, 500-2000 nm in length), are 100% cellulose and contain both amorphous and crystalline regions.

Cellulose nanocrystals (CNC): CNCs are rod-like or whisker shaped particles remaining after acid hydrolysis of WF, PF, MCC, MFC, or NFC. These particles have also been named nanocrystalline cellulose, cellulose whiskers, cellulose nanowhiskers and cellulose microcrystals (in the early literature). CNCs have a high aspect ratio (3-5 nm wide, 50-500 nm in length), are 100% cellulose, are highly crystalline (54-88%)

Tunicate cellulose nanocrystals (t-CNC): Particles produced from the acid hydrolysis of tunicates are called t-CNCs. The ribbon-like shaped t-CNCs have a height of B8 nm, a width of B20 nm, a length of 100-4000 nm (typical aspect ratios 70-100), are 100% cellulose, are highly crystalline (85-100%).

Microcrystalline cellulose (MCC): Cellulose microparticles produced commercially via regular pre-treatments (delignification, bleaching, grinding and/or acid hydrolysis and back-neutralization with alkali). Their width 10-50 µm and length 10-500 µm. They are the current commercial source for producing MFC, NFC and CNCs.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A nanocellulose material that is of plant origin and comprises nanocellulose particles or fibres derived from a plant material, wherein the nanocellulose material has a hemicellulose content of 30% w/w or greater, wherein the nanocellulose material comprises nanocellulose particles or fibres having a diameter of up to 20 nm.

2. The nanocellulose material as claimed in claim 1 wherein the plant material has a hemicellulose content of from 30 to 50% w/w and the nanocellulose material has a hemicellulose content of from 30 to 50% w/w.

3. The nanocellulose material as claimed in claim 2 wherein the plant material has a hemicellulose content of from 30 to 45% w/w and the nanocellulose material has a hemicellulose content of from 30 to 45%.

4. The nanocellulose material as claimed in claim 3 wherein the plant material has a hemicellulose content of from 32 to 38% w/w and the nanocellulose material has a hemicellulose content of from 32 to 38%.

5. The nanocellulose material as claimed in claim 4 wherein the plant material has a hemicellulose content of from 32 to 36% w/w and the nanocellulose material has a hemicellulose content of from 32 to 36%.

6. The nanocellulose material as claimed in claim 1 wherein the nanocellulose material has an aspect ratio of at least 250.

7. The nanocellulose material as claimed in claim 6 wherein the nanocellulose material has an aspect ratio of between 250 to 10,000.

8. The nanocellulose material as claimed in claim 7 wherein the nanocellulose material has an aspect ratio of between 250 to 5000.

9. The nanocellulose material as claimed in claim 8 wherein the nanocellulose material has an aspect ratio of between 250 to 1000.

10. The nanocellulose material as claimed in claim 9 wherein the nanocellulose material has an aspect ratio of between 266 to 958.

11. The nanocellulose material as claimed in claim 1 wherein the nanocellulose is derived from a plant material having C4 leaf anatomy.

12. The nanocellulose material as claimed in claim 1 wherein the nanocellulose material comprises cellulose nanocrystals (CNC) or nanofibrillated cellulose (NFC).

13. The nanocellulose material as claimed in claim 1 wherein the nanocellulose material comprises nanocellulose particles or fibres having a diameter of up to 15 nm.

14. The nanocellulose material as claimed in claim 13 wherein the nanocellulose material comprises nanocellulose particles or fibres having a diameter of up to 10 nm.

15. The nanocellulose material as claimed in claim 14 wherein the nanocellulose material comprises nanocellulose particles or fibres having a diameter of up to 8 nm.

16. The nanocellulose material as claimed in claim 1 wherein the nanocellulose material comprises nanocellulose particles or fibres having a length that falls within the range of from 200 nm up to 10 μm.

17. The nanocellulose material as claimed in claim 1 wherein the nanocellulose material is derived from plant material in which an amount of hemicellulose in the plant material is greater than an amount of lignin in the plant material.

18. The nanocellulose material as claimed in claim 1 wherein the nanocellulose material is derived from plant material and the plant material is derived from a drought-tolerant grass species.

19. The nanocellulose material as claimed in claim 18 wherein the plant material is derived from arid grass species.

20. The nanocellulose material as claimed in claim 1 wherein the nanocellulose material is derived from plant material and the plant material is derived from Australian native arid grass known as "*spinifex*" from the genera *Triodia, Monodia,* or *Symplectrodia, T. pungens, T. shinzii, T. basedowii,* or *T. longicep.*

21. The nanocellulose material as claimed in claim 1 wherein the nanocellulose material is derived from plant material and the plant material is derived from *Digitaria sanguinalis* (L.) Scopoli, *Panicum coloratura* L. var. *makarikariense* Goossens, *Brachiaria brizantha* (Hochst. Ex A. Rich) Stapf, *D. violascens* Link, *P. dichotomiflorum* Michaux, *B. decumbens* Stapf, *Echinochloa crus-galli* P. Beauv., *P. miliaceum* L., *B. humidicola* (Rendle) Schweick., *Paspalum distichum* L., *B. mutica* (Forsk.) Stapf, *Setaria glauca* (L.) P. Beauv, *Cynodon dactylon* (L.) Persoon, *Panicum maximum* Jacq., *S. viridis* (L.) P. Beauv, *Eleusine coracana* (L.) Gaertner, *Urochloa texana* (Buckley) Webster, *Sorghum sudanense* Stapf, *E. indica* (L.) Gaertner, *Spodiopogon cotulifer* (Thunb.) Hackel, *Eragrostis cilianensis*(Allioni) Vignolo-Lutati, *Chloris gayana* Kunth, *Eragrostis curvula, Leptochloa dubia, Muhlenbergia wrightii, E. ferruginea* (Thunb.) P. Beauv., *Sporobolus indicus* R. Br. var. *purpureo-suffusus* (Ohwi) *T. Koyama, Andropogon gerardii, Leptochloa chinensis* (L.) Nees, grasses of the *Miscanthus* genus (elephant grass), plants of the genus *Salsola* including Russian Thistle, ricestraw, wheat straw, and corn stover, and *Zoysia tenuifolia* Willd, or derived from plant material derived from arid grasses, *Anigozanthos, Austrodanthonia, Austrostipa, Baloskion pallens, Baumea juncea, Bolboschoenus, Capillipedium, Carex bichenoviana, Carec gaudichaudiana, Carex appressa, C. tereticaulis, Caustis, Centrolepis, Chloris truncate, Chorizandra, Conostylis, Cymbopogon, Cyperus, Desmocladus flexuosa, Dichanthium sericeum, Dichelachne, Eragrostis, Eurychorda complanata, Evandra aristata, Ficinia nodosa, Gahnia, Gymnoschoenus sphaerocephalus, Hemarthria uncinata, Hypolaeana, Imperata cylindrical, Johnsonia, Joycea pallid, Juncus, Kingia australis, Lepidosperma, Lepironia articulate, Leptocarpus, Lomandra, Meeboldina, Mesomelaena, Neurachne alopecuroidea, Notodanthonia, Patersonia, Poa, Themeda triandra, Tremulina tremula, Triglochin, Triodia* and *Zanthorrhoea, Aristida pallens* (Wire grass), *Andropogon gerardii* (Big bluestem), *Bouteloua eriopoda* (Black grama), *Chloris roxburghiana* (Horsetail grass), *Themeda triandra* (Red grass), *Panicum virga-*

*tum* (Switch grass), *Pennisetum ciliaris* (Buffel grass), *Schizachyrium scoparium* (Little bluestem), *Sorghatrum nutans* (Indian grass), *Ammophila arenaria* (European beach grass) and *Stipa tenacissima* (Needle grass).

\* \* \* \* \*